US010643570B2

(12) United States Patent
Tanaka et al.

(10) Patent No.: US 10,643,570 B2
(45) Date of Patent: *May 5, 2020

(54) DISPLAY CONTROL APPARATUS AND DISPLAY CONTROL METHOD THAT PREVENT EXCESSIVE DETERMINATIONS OF AN ABNORMAL CONTROL CONDITION

(71) Applicant: MITSUBISHI ELECTRIC CORPORATION, Tokyo (JP)

(72) Inventors: Kohei Tanaka, Tokyo (JP); Shota Yamamoto, Tokyo (JP); Mitsuo Shimotani, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/317,378

(22) PCT Filed: Sep. 12, 2016

(86) PCT No.: PCT/JP2016/076748
§ 371 (c)(1),
(2) Date: Jan. 11, 2019

(87) PCT Pub. No.: WO2018/047322
PCT Pub. Date: Mar. 15, 2018

(65) Prior Publication Data
US 2019/0228735 A1    Jul. 25, 2019

(51) Int. Cl.
*G06T 7/00* (2017.01)
*G09G 5/00* (2006.01)
(Continued)

(52) U.S. Cl.
CPC .............. *G09G 5/003* (2013.01); *B60K 35/00* (2013.01); *B60K 37/06* (2013.01); *G09G 3/20* (2013.01);
(Continued)

(58) Field of Classification Search
CPC ........ H04N 17/04; B60K 35/00; B60K 37/06; B60K 2370/52; G09G 3/20; G09G 5/00;
(Continued)

(56) References Cited

U.S. PATENT DOCUMENTS

2003/0012283 A1*  1/2003  Ishihara ................. H04N 19/51
                                                                375/240.16
2010/0202223 A1   8/2010  Kuroki
2012/0036418 A1   2/2012  Morino et al.

FOREIGN PATENT DOCUMENTS

DE       60009195 T2      8/2004
EP        2254039 A1     11/2010
(Continued)

OTHER PUBLICATIONS

International Search Report (PCT/ISA/210) issued in PCT/JP2016/076748, dated Dec. 6, 2016.
(Continued)

*Primary Examiner* — Jacinta M Crawford
(74) *Attorney, Agent, or Firm* — Birch, Stewart, Kolasch & Birch, LLP

(57) ABSTRACT

Provided is a technique that prevents excessive determination that control in a display control apparatus is abnormal. The display control apparatus includes an image acquisition unit, an image transmitter, and a controller. The controller determines, whenever necessary, on the basis of a second image that is output from the image transmitter and check data that is acquired in the image acquisition unit, whether the control in the display control apparatus is abnormal. The controller stops the determination until a predetermined time elapses from a first time point, the predetermined time being equal to or greater than a time from the first time point at which the check data is input to the controller to a second time point at which the second image is input to the controller.

12 Claims, 19 Drawing Sheets

(51) Int. Cl.
*B60K 35/00* (2006.01)
*H04N 17/04* (2006.01)
*B60K 37/06* (2006.01)
*G09G 3/20* (2006.01)

(52) U.S. Cl.
CPC ............... *G09G 5/00* (2013.01); *H04N 17/04* (2013.01); *B60K 2370/52* (2019.05); *G09G 2380/10* (2013.01)

(58) Field of Classification Search
CPC ...... G09G 5/003; G09G 2380/10; G06T 7/00; G06T 7/70002
USPC .......................... 382/100, 149, 181, 276, 309
See application file for complete search history.

(56) References Cited

FOREIGN PATENT DOCUMENTS

| | | |
|---|---|---|
| JP | 2010-86246 A | 4/2010 |
| JP | 2012-35677 A | 2/2012 |
| JP | 2012-58997 A | 3/2012 |
| WO | WO 2018/051506 A1 | 3/2018 |

OTHER PUBLICATIONS

German Office Action, dated Oct. 21, 2019, for German Application No. 112016007054.3, with an English translation.

\* cited by examiner

FIG. 15

| OBJECT TO BE INSPECTED | PRIORITY |
|---|---|
| VEHICLE ABNORMALITY | 90 |
| ENGINE ABNORMALITY | 100 |
| BRAKE STATUS | 80 |
| DIRECTION INDICATOR STATUS | 50 |
| SHIFT LEVER STATUS | 70 |
| LOW GASOLINE LEVEL | 20 |

| PRIORITY | FRAME |
|---|---|
| 90 | 512 |
| 100 | 1024 |
| 80 | 256 |
| 50 | 32 |
| 70 | 128 |
| 20 | 2 |

| DISPLAY COORDINATE | PRIORITY |
|---|---|
| (0,0)-(30,300) | 90 |
| (0,300)-(30,500) | 100 |
| (0,500)-(30,800) | 80 |
| (30,300)-(60,500) | 50 |
| (100,385)-(450,415) | 70 |
| (430,10)-(470,40) | 20 |

DISPLAY CONTROL APPARATUS AND DISPLAY CONTROL METHOD THAT PREVENT EXCESSIVE DETERMINATIONS OF AN ABNORMAL CONTROL CONDITION

This application is related to co-pending application Ser. No. 16/323,866, filed on Feb. 7, 2019.

TECHNICAL FIELD

The present invention relates to a display control apparatus that controls display in a display apparatus, and to a display control method in the display apparatus.

BACKGROUND ART

Display control apparatuses are proposed that include inspection modules. The inspection modules compare generated images with desired images to be acquired from the generated images having normally undergone pre-processing for display in the display apparatuses. Such a display control apparatus enables checking whether an image that is input from the display control apparatus to the display apparatus is normal, and by extension, whether an image that is displayed in the display apparatus is normal.

To correctly perform this checking, another image identical to the image that is input to the display apparatus and check data used for the comparison need to be input to the inspection module at almost the same timing. Proposed are various techniques for detailed timing-control in order to achieve such simultaneous input. For instance, Patent Document 1 proposes temporally storing, in a buffer, check data generated from an image to be displayed, and inputting the check data and an image that is read to an inspection module at the timing of reading the image to be displayed from a memory.

PRIOR ART DOCUMENTS

Patent Documents

Patent Document 1: Japanese Patent Application Laid-Open No. 2012-035677

SUMMARY

Problem to be Solved by the Invention

Unfortunately, a complex, image-generating software renders the timing of image input to the inspection module difficult to coincide with the timing of check data input to the inspection module. As a result, the control in the display control apparatus is excessively determined to be abnormal.

To solve this problem, it is an object of the present invention to provide a technique for preventing excessive determination that control in a display control apparatus is abnormal.

Means to Solve the Problem

A display control apparatus according to the present invention controls display in a display apparatus. The display control apparatus includes the following: an image acquisition unit configured to acquire a first image on the basis of an external input; and an image transmitter configured to output, to the display apparatus, a second image being the first image that has undergone pre-processing for display in the display apparatus. The image acquisition unit is configured to further acquire, on the basis of the external input, check data for checking that a third image is input to the display apparatus, the third image being to be acquired from the first image having normally undergone the pre-processing. The display control apparatus further includes a controller configured to receive the second image as output from the image transmitter and the check data as acquired in the image acquisition unit, and to determine, whenever necessary, on the basis of the second image and the check data, whether the control in the display control apparatus over the display apparatus is abnormal. The controller is configured to stop the determination until a predetermined time elapses from a first time point, the predetermined time being equal to or greater than a time from the first time point at which the check data is input to the controller to a second time point at which the second image is input to the controller.

Effects of the Invention

According to the present invention, the determination whether the control in the display control apparatus over the display apparatus is abnormal is stopped until the predetermined time elapses from the first time point, the predetermined time being equal to or greater than the time from the first time point, at which the check data is input to the controller, to the second time point, at which the second image is input to the controller. This prevents the excessive determination that the control in the display control apparatus is abnormal.

These and other objects, features, aspects and advantages of the present invention will become more apparent from the following detailed description of the present invention when taken in conjunction with the accompanying drawings.

BRIEF DESCRIPTION OF DRAWINGS

FIG. 15 is a table showing one example of priorities according to the fourth embodiment.

DESCRIPTION OF EMBODIMENT(S)

First Embodiment

Figure 1:
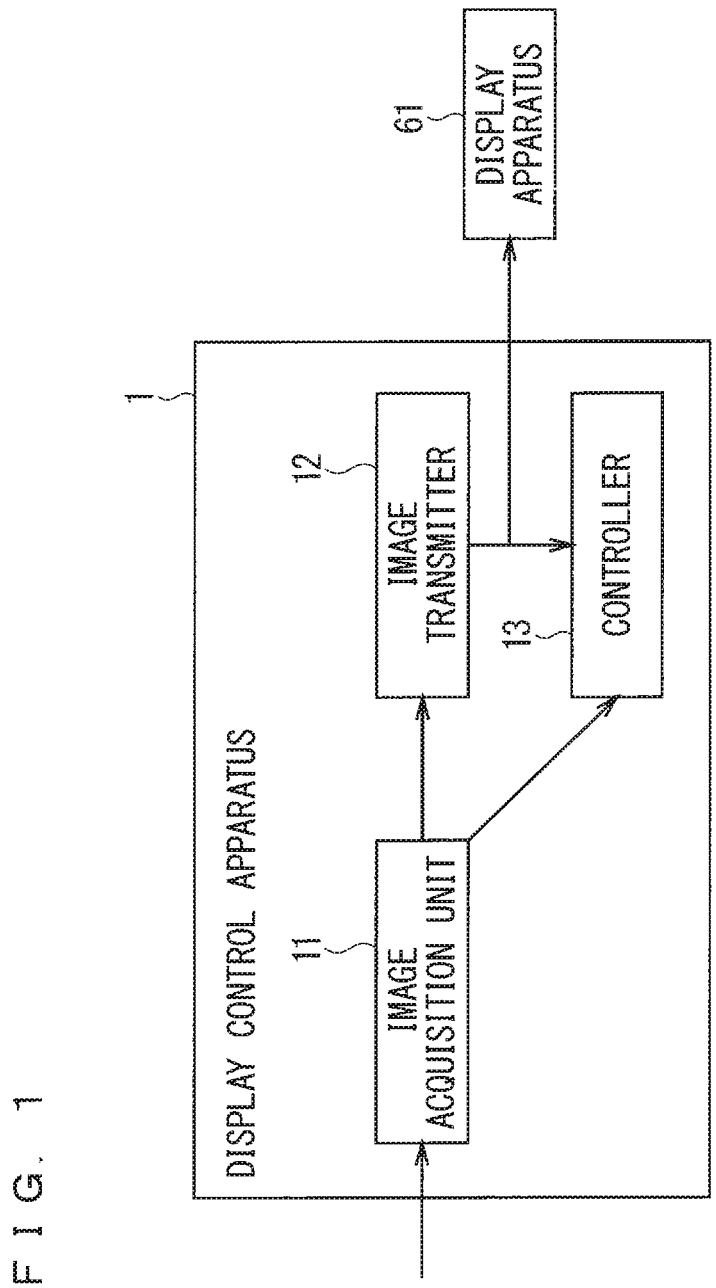
FIG. 1 is a block diagram illustrating the configuration of a display control apparatus according to a first embodiment.

FIG. 1 is a block diagram illustrating the configuration of a display control apparatus according to a first embodiment. A display control apparatus 1 in FIG. 1 controls display in a display apparatus 61, and includes an image acquisition unit 11, an image transmitter 12, and a controller 13. An example of the display apparatus 61 is a liquid crystal display used as a display apparatus that displays a vehicle's instrument panel, as an industrial display apparatus, or as other apparatuses.

The image acquisition unit 11 acquires a first image and check data on the basis of an external input. For instance, the image acquisition unit 11 may acquire the first image by generating the first image on the basis of the external input. Alternatively, the image acquisition unit 11 may acquire the first image by selecting a single fist image from among a plurality of prepared first images on the basis of the external input. The image acquisition unit 11 similarly acquires the check data. The following mainly describes that the image acquisition unit 11 generates the first image and the check data. Hereinafter, the first image can be referred to as a "generated image".

This generated image undergoes, in the display control apparatus 1, pre-processing for display in the display apparatus 61. Examples of the pre-processing for display in the display apparatus 61 include double buffering and triple buffering for synchronization with the display in the display apparatus 61, and image superimposition.

Hereinafter, a second image can be referred to as a "processed image". The second image is the generated image that has undergone the pre-processing for display in the display apparatus 61. Hereinafter, a third image can be referred to as a "desired image". The third image is acquired from the generated image having normally undergone the pre-processing. If the pre-processing has been normally performed, the processed image is identical to the desired image; otherwise, the processed image is different from the desired image.

The check data is used to check that the desired image is input to the display apparatus 61. The check data contains, for instance, a partial image of the generated image, which is the first image, a partial region in which the partial image is displayed, and other kinds of data. The generated data and the check data are sent from the same unit in the first embodiment. This enables highly precise determination, which will be described later on.

The image transmitter 12 outputs the processed image to the display apparatus 61. The processed image as output to the display apparatus 61 is displayed by the display apparatus 61.

The controller 13 comprehensively controls the components of the display control apparatus 1. The controller 13 also receives the processed image as output from the image transmitter 12, and the check data as generated in the image acquisition unit 11. The controller 13 determines, whenever necessary, on the basis of the processed image and the check data, whether the control in the display control apparatus 1 over the display apparatus 61 is abnormal, that is, whether display control is abnormal.

Figure 2:
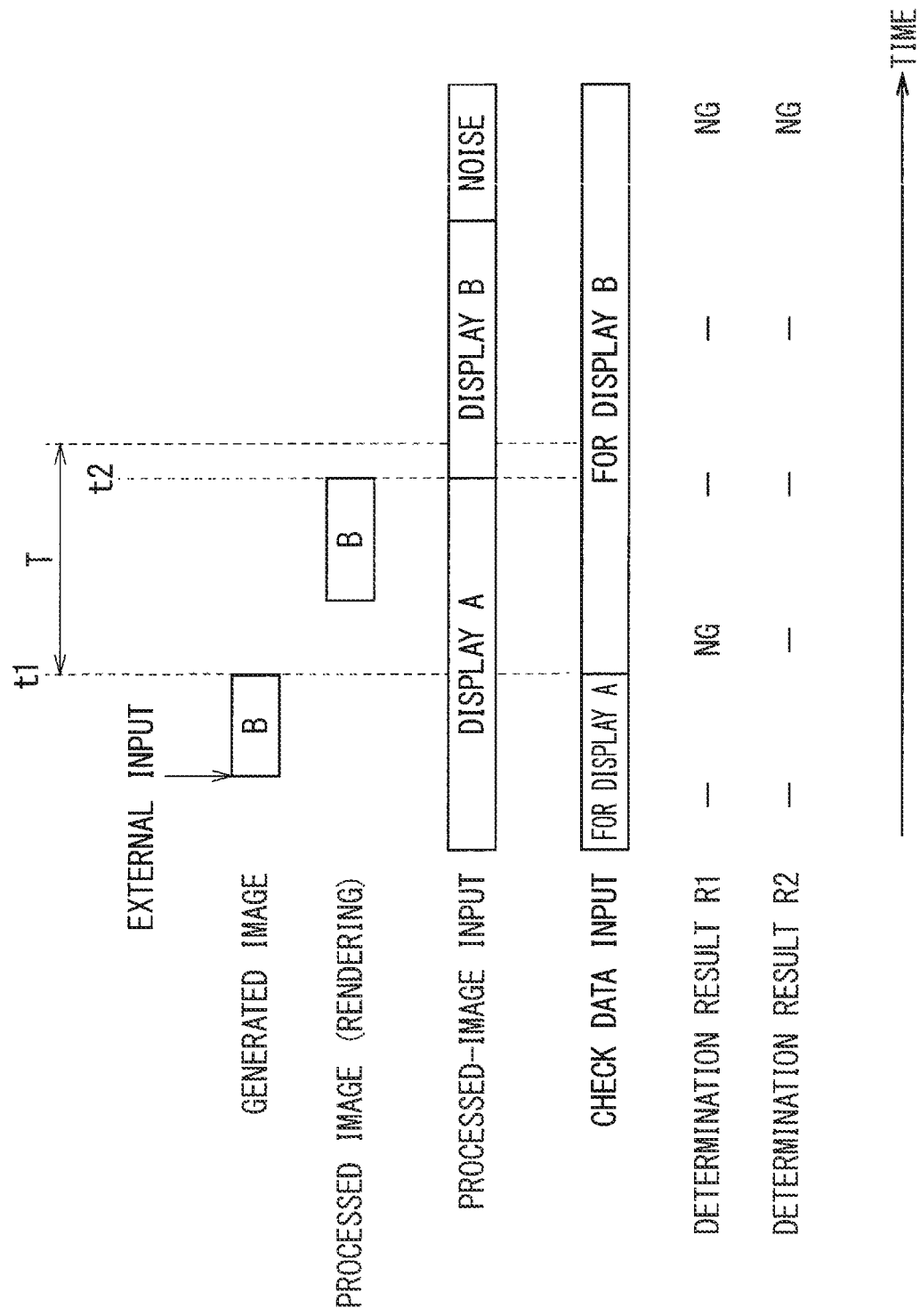
FIG. 2 is a timing chart showing the operation of the display control apparatus according to the first embodiment.

Here, as illustrated in FIG. 2, the check data for a display B is input to the controller 13 at almost the same timing as the generation of a generated image B. In contrast to this, since the pre-processing for display in the display apparatus 61 takes some time, the processed image is input to the controller 13 at the timing t2 after the timing t1 at which the generated image is generated and the timing t1 at which the check data is input to the controller 13, as indicated by the display B in FIG. 2.

Hence, in determination upon reception of the check data, the controller 13 performs the determination using check data that is not consistent with the processed image. In this case, the controller 13 can determine that the display control is abnormal in determination upon reception of the check data, as indicated by an item, "Determination Result R1" in FIG. 2. Reference is made to an indication, "-,NG,-,-,NG" in Determination Result R1. The indication, "NG" represents a determination that the display control is abnormal. Moreover, the indication, "-" represents no determination that the display control is abnormal.

In contrast to this, the controller 13 according to the first embodiment stops the determination until a predetermined time T elapses from a first time point t1, as illustrated in FIG. 2. Here, the predetermined time T is equal to or greater than a time from the first time point t1 at which the check data is input to the controller 13, to a second time point t2 at which the processed image is input to the controller 13. An item, "Determination Result R2" in FIG. 2 represents one example of the result of the determination in the controller 13. Reference is made to an indication, "-,-,-,-,NG" in Determination Result R2. The indication, "NG" represents a determination that the display control is abnormal. Moreover, the indication, "-" represents either no determination as made, or no determination as made that the display control is abnormal.

Gist of First Embodiment

In the display control apparatus 1 according to the first embodiment, the controller 13 fails to determine whether the display control is abnormal until receiving the processed image. This prevents excessive determination that the display control is abnormal, as indicated by Determination Result R2 in FIG. 2.

The display apparatus 61 presumably fails to display the desired image depending on display image superimposition, during the use of the display control apparatus 1 after delivery. Accordingly, the determination in the controller 13 is effective particularly during the use of the display control apparatus 1 after delivery. Such a determination may be conducted in, for instance, a product test before delivery.

Second Embodiment

Figure 3:
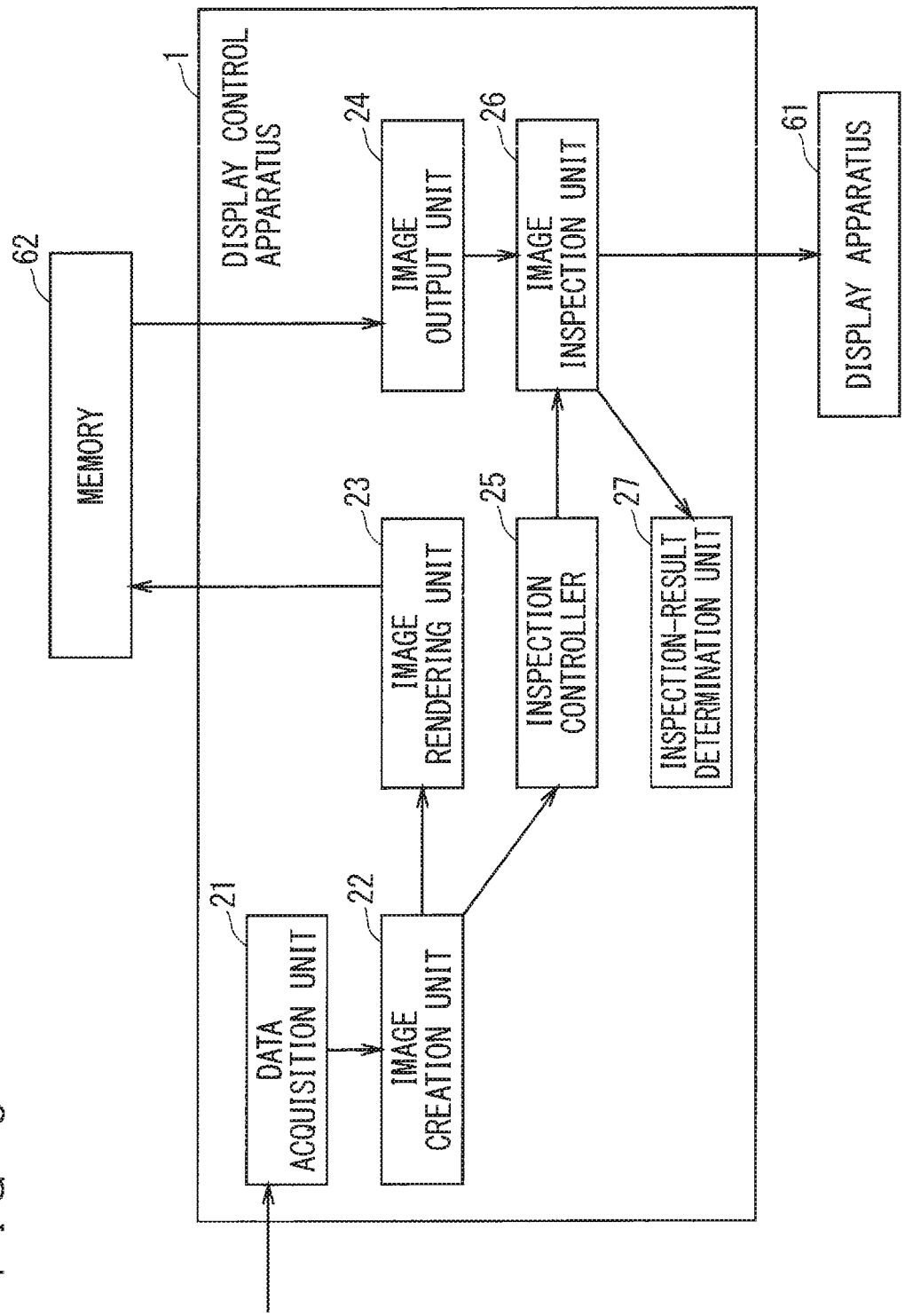
FIG. 3 is a block diagram illustrating the configuration of a display control apparatus according to a second embodiment.

FIG. 3 is a block diagram illustrating the configuration of a display control apparatus according to a second embodiment. Identical or similar components between the first and second embodiments are denoted by the same reference signs. Mainly described herein are different components between the first and second embodiments.

The display control apparatus 1 in FIG. 3 includes a data acquisition unit 21, an image creation unit 22, an image rendering unit 23, an image output unit 24, an inspection controller 25, an image inspection unit 26, and an inspection-result determination unit 27. A memory 62 is connected between the image rendering unit 23 and the image output unit 24. It is noted that the memory 62, although disposed outside the display control apparatus 1, may be included in the display control apparatus 1.

The data acquisition unit 21, the image creation unit 22, and the image rendering unit 23 correspond to the image acquisition unit 11 in the first embodiment. The image output unit 24 corresponds to the image transmitter 12 in the first embodiment. The inspection controller 25, the image inspection unit 26, and the inspection-result determination unit 27 correspond to the controller 13 in the first embodiment. In the second embodiment, the inspection controller 25 is implemented by software; in addition, the image inspection unit 26 and the inspection-result determination unit 27 are included in hardware. The display control apparatus 1, which includes such a combination of the function implemented by software and of hardware, reduces process steps for software development that achieves the display control apparatus 1, simplifies software, and by extension, saves the memory capacity of the display control apparatus 1.

Firstly, the following outlines the display control apparatus 1 according to the second embodiment. The image inspection unit 26 receives a processed image some time after the image inspection unit 26 receives check data. The image inspection unit 26, like the same way as the controller 13 in the first embodiment, determines whether display control is abnormal on the basis of the processed image and check data as input to the image inspection unit 26. Then, the image inspection unit 26 in the second embodiment, like the same in the first embodiment, stops the determination until a predetermined time T elapses from a first time point t1. Here, the predetermined time T is equal to or greater than a time from the first time t1 at which the check data is input to the image inspection unit 26, to a second time point t2 at which the processed image is input to the image inspection unit 26. This prevents excessive determination that the display control is abnormal.

Next, the following details the components according to the second embodiment.

The data acquisition unit 21 acquires an external input. Examples of the external input include device status and other kinds of status. Examples of the device status include the status of a vehicle-installed electronic control unit (ECU) and other kinds of status. The status of the vehicle-installed ECU is transmitted and received over a vehicle network, such as a controller area network (CAN).

The image creation unit 22 generates an image on the basis of the external input and then outputs the image to the image rendering unit 23, in response to a factor, such as a change in the external input as acquired by the data acquisition unit 21, that leads to display switching. The image creation unit 22 also generates, on the basis of the external input, the check data that is consistent with the image as generated, and then outputs the check data to the inspection controller 25.

For instance, the external input can include a warning status indicating that gasoline level is less than a predetermined level. Then, the image creation unit 22 generates a warning image indicating a low gasoline level, and then outputs the warning image to the image rendering unit 23. At the same time, the image creation unit 22 generates check data that is consistent with the warning image, and then outputs the check data to the inspection controller 25, to thus notify the inspection controller 25 of the start of warning display.

The image rendering unit 23 writes the image as generated in the image creation unit 22, that is, a generated image, into a frame buffer included in the memory 62 through a process such as rendering. An item, "Processed Image (Rendering)" in FIG. 4 indicates the timing of rendering into the memory 62. The rendering timing comes after the timing of image generation in the image creation unit 22, indicated by an item, "Generated Image" in FIG. 4.

In the second embodiment, the image rendering unit 23 superimposes a currently displayed image upon the image from the image creation unit 22, and renders a resulting image as superimposed into the memory 62. Such an image rendering unit 23 can serve as a compositor function in a widow system in which the image creation unit 22 is used as client modules, such as a wayland-server and an x server. In this case, provided is image superimposition mainly by software.

In this embodiment, the image creation unit 22 generates the image, and then the image rendering unit 23 renders the image into the memory 62. In some embodiments, the image creation unit 22 may select an image ID, and then the image rendering unit 23 may render an image that is consistent with the image ID into the memory 62.

Figure 4:
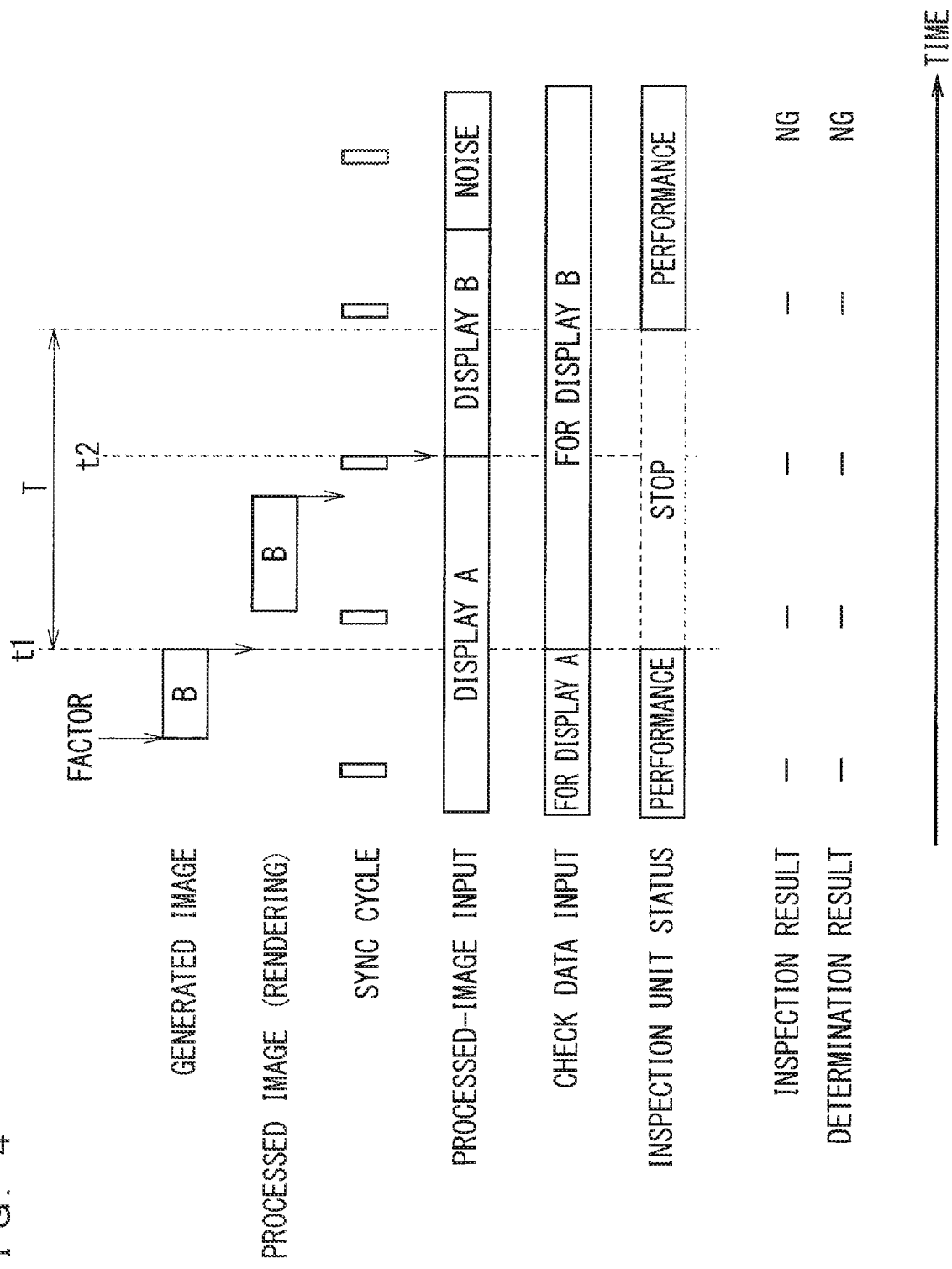
FIG. 4 is a timing chart showing the operation of the display control apparatus according to the second embodiment.

As indicated by an item, "Processed-Image Input" in FIG. 4, the image output unit 24 reads image data of the generated image as stored in the memory 62, in agreement with the cycle of a synchronization (sync) signal, which is a kind of synchronization signal of the display apparatus 61, and then outputs the image data to the image inspection unit 26 and the display apparatus 61. An example of the sync signal is a vertical synchronization (v-sync) signal.

The image that is read by the image output unit 24 from the memory 62 and is then output undergoes synchronization for display in the display apparatus 61, and corresponds to the processed image described in the first embodiment. That is, the image output unit 24 outputs the processed image to the image inspection unit 26 and the display apparatus 61 in agreement with the cycle of the sync signal. The example of FIG. 3 shows that the image output unit 24 outputs the processed image to the display apparatus 61 via the image inspection unit 26.

The inspection controller 25, upon receiving the check data from the image creation unit 22, writes the check data into the image inspection unit 26 through a process such as output, as indicated by an item, "Check Data Input" in FIG. 4. The inspection controller 25, upon receiving the check data from the image creation unit 22, also controls inspection in the image inspection unit 26. The control in the inspection controller 25 over the inspection in the image inspection unit 26 will be detailed later on.

The image inspection unit 26 receives the processed image as output from the image output unit 24 and the check data as output from the inspection controller 25. The image inspection unit 26 inspects, whenever necessary, on the basis of the processed image and the check data, whether the aforementioned desired image is not input to the display apparatus 61.

In the second embodiment, the image inspection unit 26 determines whether the processed image is a desired image that can be checked using the check data, on the basis of the processed image and check data as received. For instance, the image inspection unit 26 calculates an inspection value, such as a CRC, of the processed image as received, and determines whether the difference between the calculated inspection value of the processed image and an inspection value of the desired image is less than a threshold, the inspection value being contained in the check data as received. If the difference is less than the threshold, the image inspection unit 26 determines that the processed image as received is a desired image. If the difference is equal to or more than the threshold, the image inspection unit 26 determines that the processed image as received is not a desired image, and at the same time, determines that the desired image is not input to the display apparatus 61. The image inspection unit 26 basically, periodically performs the inspection in agreement with the cycle of the sync signal.

Here, as indicated by an item, "Inspection Unit Status" in FIG. 4, the inspection controller 25 stops the image inspection unit 26 from performing the inspection until the predetermined time T elapses from the first time point t1, and allows the image inspection unit 26 to perform the inspection after the predetermined time T elapses the first time point t1. The first time point t1 is a time point at which the check data is input to the image inspection unit 26, and is substantially a time point at which the inspection controller 25 receives the check data from the image creation unit 22. The predetermined time T is equal to or greater than a time from the first time point t1 to the second time point t2 at which the processed image is input to the image inspection unit 26.

An item, "Inspection Result" in FIG. 4 shows one example of the result of the inspection in the age inspection unit 26. Reference is made to an indication, "-,-,-,-,NG" in the inspection result. The indication, "NG" indicates an inspection result as obtained that the desired image is not input to the display apparatus 61. Moreover, the indication, "-" indicates either no inspection as performed, or an inspection as performed and no inspection result as obtained that the desired image is not input to the display apparatus 61.

The image inspection unit 26 fails to send a notification, such as an interrupt, to the inspection-result determination unit 27, when no inspection is performed, and when an inspection is performed and no inspection result is obtained that the desired image is not input to the display apparatus 61. Meanwhile, the image inspection unit 26 sends a notification, such as an interrupt, to the inspection-result determination unit 27, when an inspection result is obtained that the desired image is not input to the display apparatus 61.

The inspection-result determination unit 27 determines that the display control is abnormal when receiving the interrupt notification from the image inspection unit 26, that is, when the inspection result is obtained that the desired image is not input to the display apparatus 61. Meanwhile, the inspection-result determination unit 27 fails to perform such a determination when no notification from the image inspection unit 26 is received. Examples of display control abnormality include irregularity in an output video image resulting from a failure in the memory 62 and other things.

An item, "Determination Result" in FIG. 4 shows one example of the inspection result in the image inspection unit 27. Reference is made to the indication, "-,-,-,-,NG" in Determination Result. The indication, "NG" represents a determination that the display control is abnormal. Moreover, the indication, "-" represents no determination as made that the display control is abnormal. In the second embodiment, the inspection result in the image inspection unit 26 is substantially the same as the determination result in the inspection-result determination unit 27, as shown in FIG. 4.

The inspection-result determination unit 27, in determining that the display control is abnormal, makes an audio output unit, which is not shown, outputs a warning sound, or turns off all displays in the display apparatus 61 to thus perform notification control for notifying a user of display control abnormality.

Operation

Figure 5:
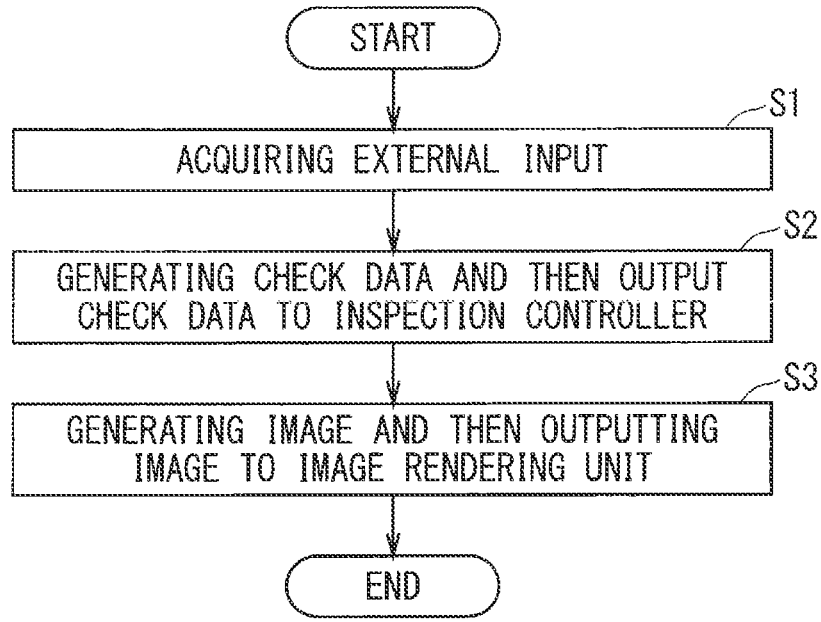
FIG. 5 is a flowchart showing processing in the display control apparatus according to the second embodiment.

FIG. 5 is a flowchart showing image creation according to the second embodiment.

In step S1, the data acquisition unit 21 firstly acquires an external input, such as an external data piece. In response to a change in the external input, the image creation unit 22, in step S2, generates check data and outputs the check data to the inspection controller 25. Then, in step S3, the image creation unit 22 generates an image consistent with the check data, and then outputs the image to the image rendering unit 23. The processing in FIG. 5 then ends.

Although not shown in the processing in FIG. 5, the image rendering unit 23 renders the generated image as created in the image creation unit 22 into the memory 62, as earlier mentioned. In the second embodiment, the rendering in the image rendering unit 23 and the processing in FIG. 5 are independent of each other, and can be performed in parallel.

Figure 6:
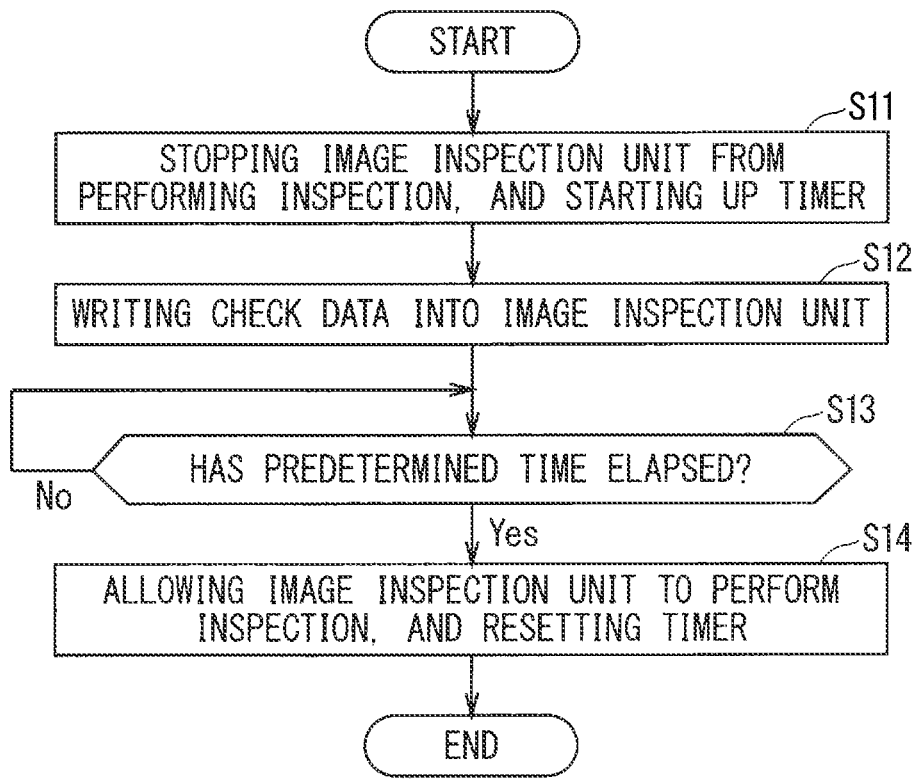
FIG. 6 is a flowchart showing processing in the display control apparatus according to the second embodiment.

FIG. 6 is a flowchart showing inspection control according to the second embodiment.

In step S11, upon receiving the check data from the image creation unit 22, the inspection controller 25 firstly stops the image inspection unit 26 from performing an inspection to render the inspection invalid, and at the same time, starts up a timer. In step S12, the inspection controller 25 writes the check data into the image inspection unit 26.

In step S13, the inspection controller 25 determines whether a time in the timer is equal to or greater than the predetermined time T, that is, whether the predetermined time T has elapsed from the time point of check data receipt from the image creation unit 22. This determination is performed independently of the cycle of the sync signal. If the predetermined time T is determined to have elapsed, the processing proceeds to step S14; otherwise, the processing returns to step S13. In step S14, the inspection controller 25 allows the image inspection unit 26 to perform the inspection to render the inspection valid, and at the same time, resets the timer. The processing in FIG. 6 then ends.

Figure 7:
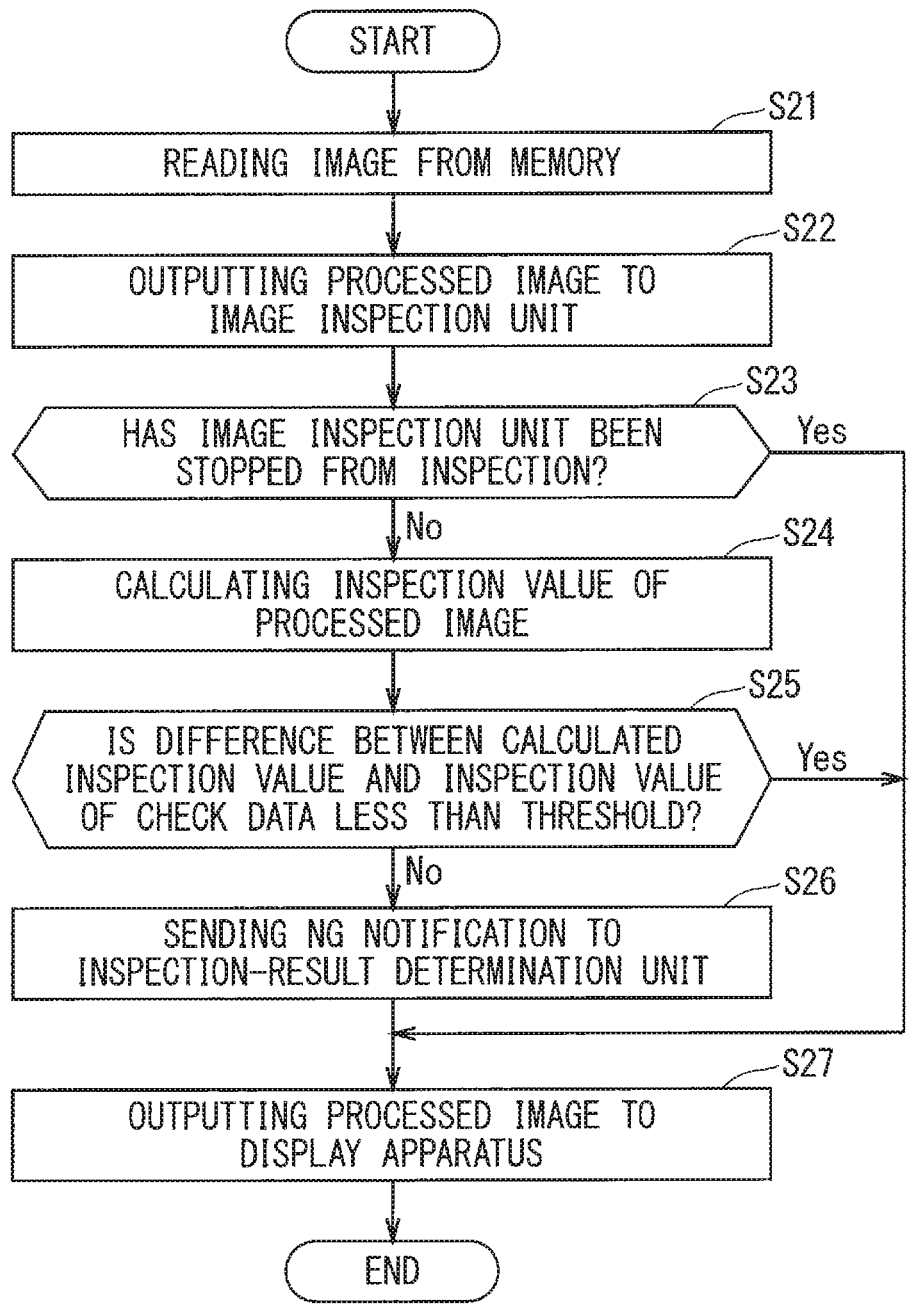
FIG. 7 is a flowchart showing processing in the display control apparatus according to the second embodiment.

FIG. 7 is a flowchart showing image output according to the second embodiment.

In the first step, step S21, the image output unit 24 reads the image from the memory 62. In step S22, the image output unit 24 outputs the image as read to the image inspection unit 26 as a processed image. The processing proceeds to step S27 in a determination in step S23 that the image inspection unit 26 is stopping the inspection. The processing proceeds to step S24 in a determination in step S23 that the image inspection unit 26 is under inspection.

In step S24, the image inspection unit 26 calculates an inspection value of the processed image from the processed image as received. In step S25, the image inspection unit 26 determines whether the difference between the inspection value as calculated and an inspection value contained in the check data is less than a threshold. If the difference is less than the threshold, the processing proceeds to step S27; If the difference is equal to or more than the threshold, to step S26.

In step S26, the image inspection unit 26 sends, to the inspection-result determination unit 27, a notification of NG, that is, an inspection result that the desired image is not input to the display apparatus 61. The processing then proceeds to step S27. In step S27, the image inspection unit 26 outputs the received processed image to the display apparatus 61. The processing in FIG. 7 then ends.

Gist of Second Embodiment

In the display control apparatus 1 according to the second embodiment, the image inspection unit 26 is made to stop the inspection until the predetermined time T elapses from the first time point t1, and is allowed to perform the inspection after the predetermined time T elapses from the first time point t1. In addition, the inspection-result determination unit 27 determines that the display control is abnormal when the inspection result that the desired image is not input to the display apparatus 61 is obtained in the image inspection unit 26. Such a configuration, like the corresponding configuration in the first embodiment, prevents excessive determination that the display control is abnormal.

First Modification

In the second embodiment, the image inspection unit 26 generates an interrupt in the inspection-result determination unit 27 when the inspection result is obtained that the desired image is not input to the display apparatus 61, that is, in response to the inspection result of NG. That is, the image inspection unit 26 generates an interrupt signal in a central processing unit (CPU) and outputs the interrupt signal to the inspection-result determination unit 27 implementing an interruption.

The image inspection unit 26 may be configured to, for instance, provide an inspection result that the desired image is input to the display apparatus 61, that is, an inspection result of OK. In response to the inspection result of OK, the image inspection unit 26 may generate an interrupt in the inspection-result determination unit 27. Alternatively, the image inspection unit 26 may be configured to provide an inspection result of OK and an inspection result of NG. In response to both of the inspection results of OK and NG, the image inspection unit 26 may generate an interrupt in the inspection-result determination unit 27.

Alternatively, the inspection-result determination unit 27 may be configured to access the image inspection unit 26 in a certain cycle, for instance, in agreement with the cycle of the sync signal, rather than the aforementioned configuration in which the image inspection unit 26 generates an interrupt in the inspection-result determination unit 27. It is noted that the first modification is applicable to a third embodiment and the subsequent embodiments, which will be described later on.

Second Modification

The inspection-result determination unit 27 may determine that the display control is abnormal when inspection result indicating that the desired image is not input to the display apparatus 61 is successively obtained over a predetermined number of times from the first time point t1. The inspection result that the desired image is not input to the display apparatus 61 can be obtained in relation to a single piece of first test data after such an inspection result is not obtained in relation to the single piece of first test data. In this case, the inspection-result determination unit 27 may determine that the display control is abnormal. The inspection-result determination unit 27 may also determine that display control is normal in not determining that the display control is abnormal. It is noted that the second modification is applicable to the third embodiment and the subsequent embodiments, which will be described later on.

Third Embodiment

Figure 8:
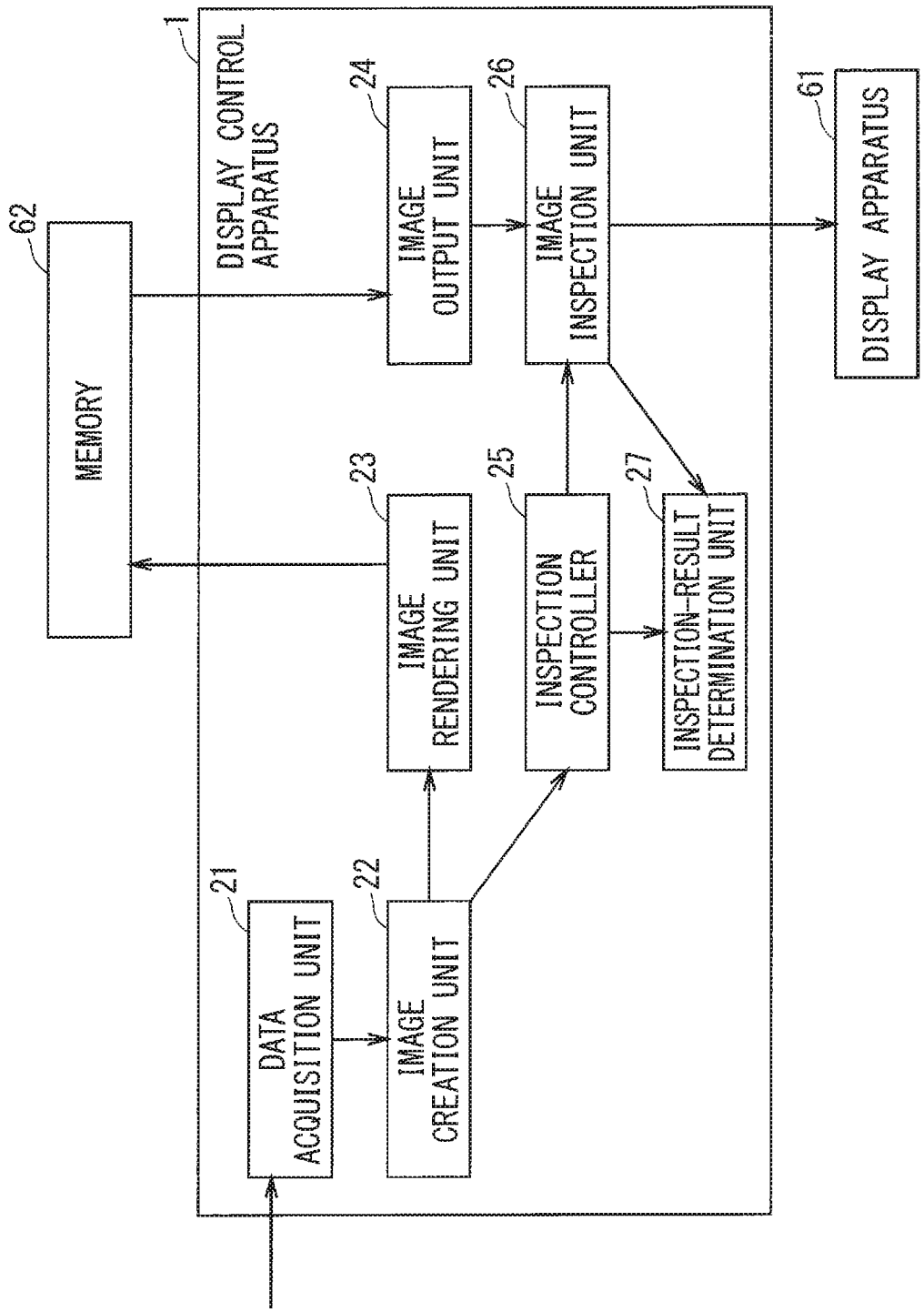
FIG. 8 is a block diagram illustrating the configuration of a display control apparatus according to a third embodiment.

FIG. 8 is a block diagram illustrating the configuration of a display control apparatus according to a third embodiment. Identical or similar components between the second and third embodiments are denoted by the same reference signs. Mainly described herein are different components between the second and third embodiments.

In the second embodiment, the image rendering unit 23 superimposes images. In the third embodiment, the image output unit 24 superimposes images. That is, in the third embodiment, not software, such as a window system, but hardware mainly superimposes images. Nevertheless, like the second embodiment, the third embodiment may include image superimposition mainly by software; in addition, like the third embodiment, the second embodiment may include image superimposition mainly by hardware.

In the second embodiment, the inspection controller 25 controls the performance and stop of the inspection in the image inspection unit 26, thus controlling the performance and stop of the determination about display control abnormality. In the third embodiment by contrast, the inspection controller 25 fails to control the performance and stop of an inspection in the image inspection unit 26; in addition, the inspection-result determination unit 27 controls the performance and stop of a determination about display control abnormality. The following details such a configuration of the display control apparatus 1 according to the third embodiment.

Figure 9:
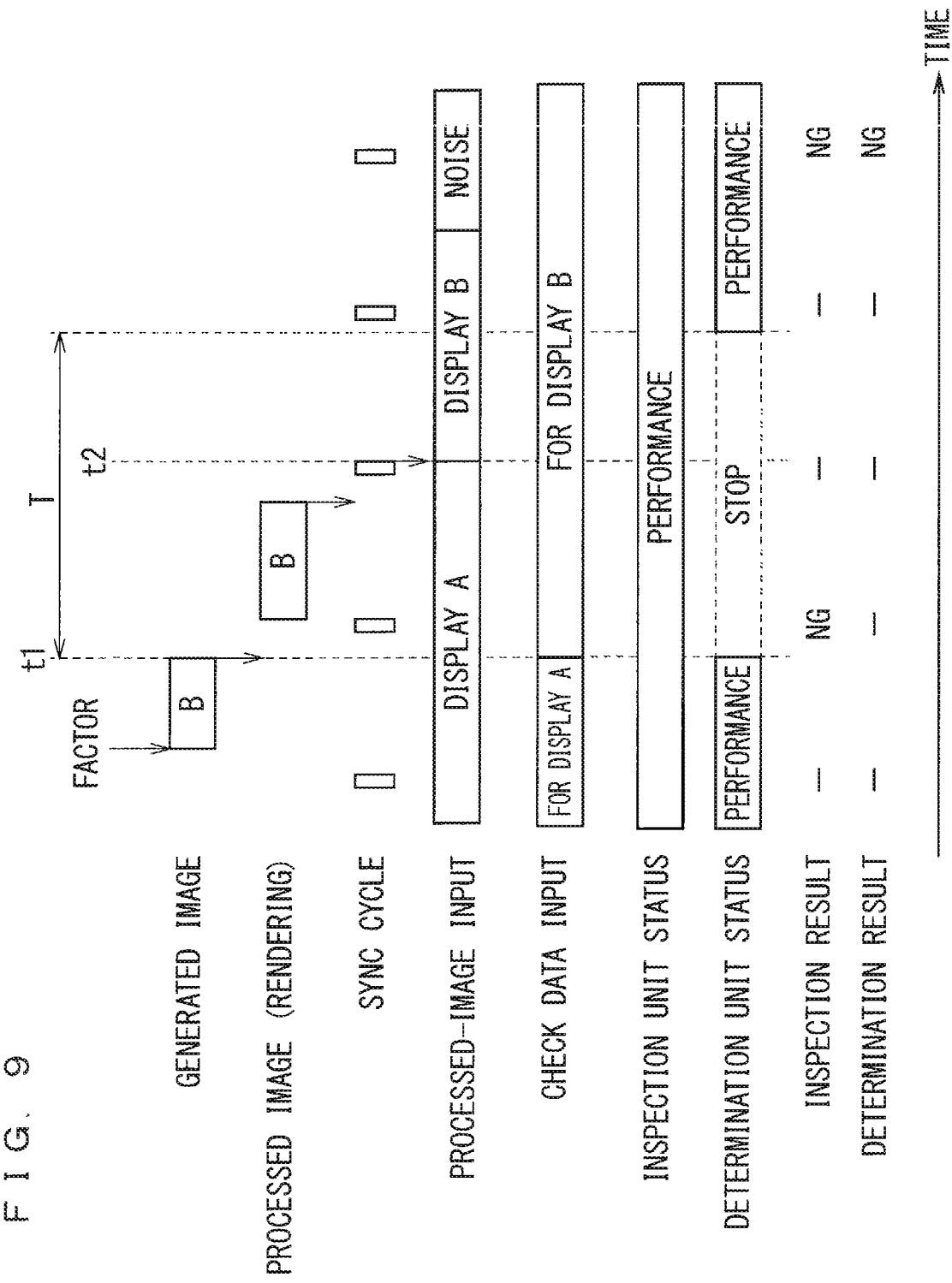
FIG. 9 is a timing chart showing the operation of the display control apparatus according to the third embodiment.

The inspection controller 25, upon receiving check data from the image creation unit 22, writes the check data into the image inspection unit 26, as indicated by an item, "Check Data Input" in FIG. 9. The inspection controller 25, upon receiving the check data from the image creation unit 22, also notifies the inspection-result determination unit 27 of a change in the check data without stopping the inspection in the image inspection unit 26. Accordingly, the inspection-result determination unit 27 is notified of the change in the check data at substantially the same timing as the check data is input to the image inspection unit 26.

The image inspection unit 26 receives a processed image that is output from the image output unit 24, and the check data that is output from the inspection controller 25. The image inspection unit 26, inspects, whenever necessary, on the basis of the processed image and the check data, whether the desired image is not input to the display apparatus 61. In the third embodiment, the image inspection unit 26 periodically performs this inspection in agreement with the cycle of a sync signal.

The inspection-result determination unit 27 basically determines that display control is abnormal when an inspection result that the desired image is not input to the display apparatus 61 is obtained in the image inspection unit 26. The inspection-result determination unit 27 fails to perform such a determination when an inspection result that the desired image is input to the display apparatus 61 is obtained in the image inspection unit 26.

Upon receiving a notification of a change in the check data from the inspection controller 25, however, the inspection-result determination unit 27 ignores an interrupt of the image inspection unit 26, which is an inspection result in the image inspection unit 26, and then stops the determination, as indicated by an item, "Determination Unit Status" in FIG. 9. That is, the inspection-result determination unit 27 stops the determination until a predetermined time T elapses from a first time point t1, and performs the determination after the predetermined time T elapses from the first time point t1.

Here, the first time point t1 is a time point at which the check data is input to the image inspection unit 26, and is substantially a time point at which the inspection-result determination unit 27 receives the notification of a change in the check data from the inspection controller 25. The predetermined time T is equal to or greater than a time from the first time point t1 to a second time point t2 at which the processed image is input to the image inspection unit 26.

In the third embodiment, the inspection-result determination unit 27 changes the predetermined time T on the basis of a time history from the first time point t1 to the second time point t2. Nevertheless, any component other than the inspection-result determination unit 27 may change the predetermined time T.

Operation

Figure 10:
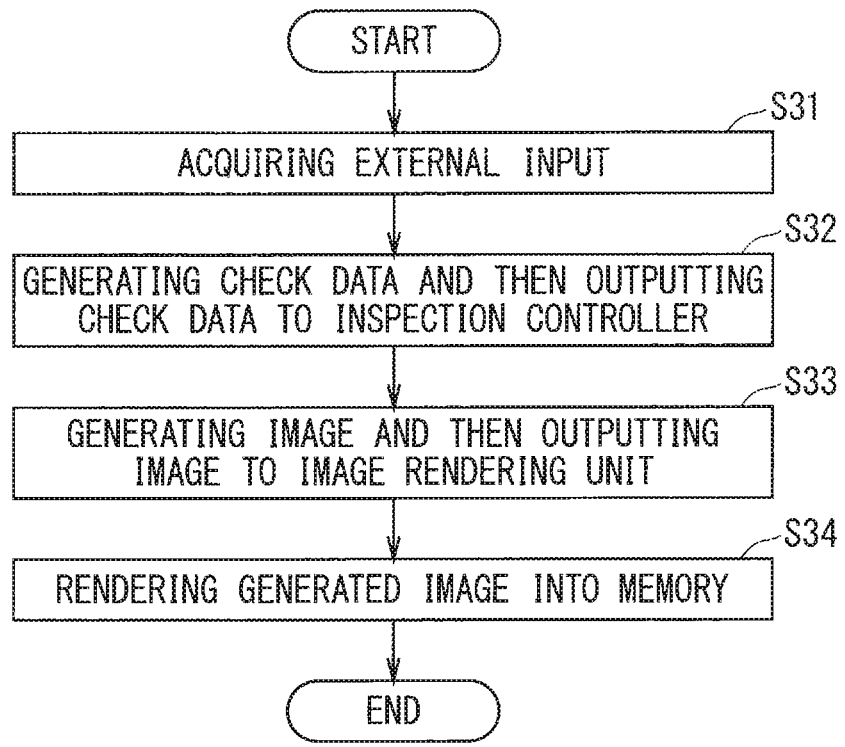
FIG. 10 is a flowchart showing processing in the display control apparatus according to the third embodiment.

FIG. 10 is a flowchart showing image creation according to the third embodiment.

In step S31, the data acquisition unit 21 firstly acquires an external input, such as an external data piece. In response to a change in the external input, the image creation unit 22, in step S32, generates check data and outputs the check data to the inspection controller 25. Then, in step S33, the image creation unit 22 generates an image consistent with the check data, and then outputs the image to the image rendering unit 23. In step S34, the image rendering unit 23 renders the generated image as created in the image creation unit 22 into the memory 62. The processing in FIG. 10 then ends.

Figure 11:
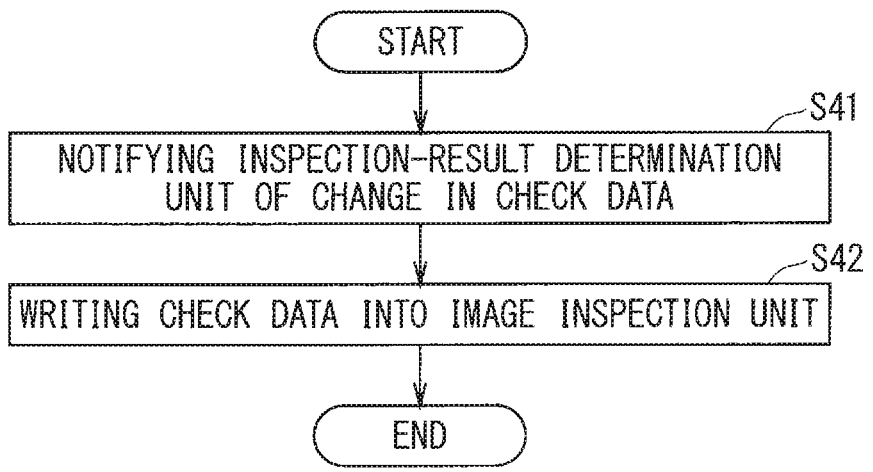
FIG. 11 is a flowchart showing processing in the display control apparatus according to the third embodiment.

FIG. 11 is a flowchart showing inspection control according to the third embodiment.

In step S41, the inspection controller 25 firstly notifies the inspection-result determination unit 27 of a change in the check data when receiving the check data from the image creation unit 22. In step S42, the inspection controller 25 writes the check data into the image inspection unit 26. The processing in FIG. 11 then ends.

Figure 12:
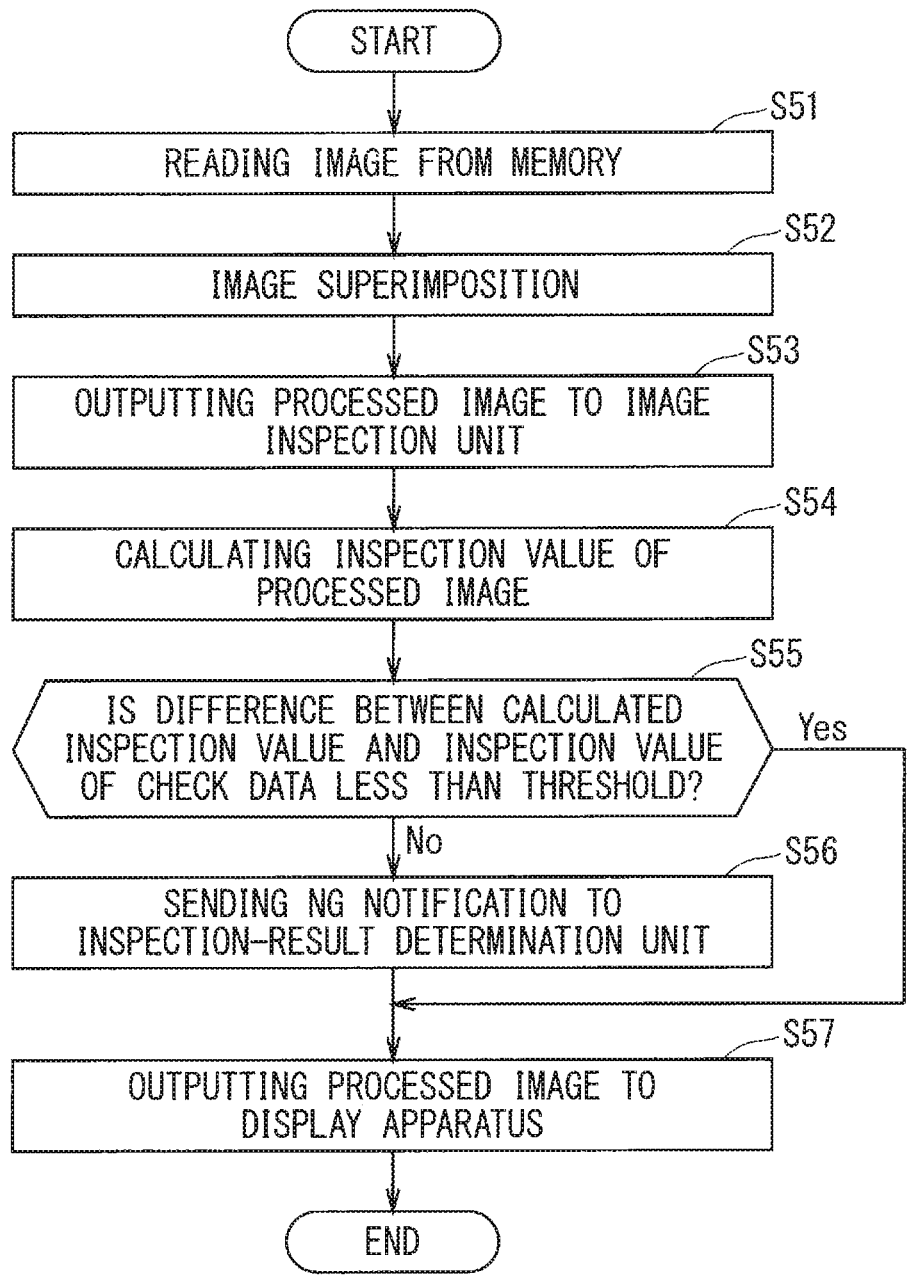
FIG. 12 is a flowchart showing processing in the display control apparatus according to the third embodiment.

FIG. 12 is a flowchart showing image output according to the third embodiment.

In step S51, the image output unit 24 firstly reads the image from the memory 62. In step S52, the image output unit 24 performs image superimposition upon the image as read, as necessary. In step S53, the image output unit 24 outputs the superimposed image to the image inspection unit 26 as a processed image.

In step S54, the image inspection unit 26 calculates an inspection value, such as a CRC, of the image as received. In step S55, the image inspection unit 26 determines whether the difference between the inspection value as calculated and an inspection value contained in the check data is less than a threshold. If the difference is less than the threshold, the processing proceeds to step S57; If the difference is equal to or more than the threshold, to step S56.

In step S56, the image inspection unit 26 sends a notification of NG to the inspection-result determination unit 27. The processing then proceeds to step S57. In step S57, the image inspection unit 26 outputs the received processed image to the display apparatus 61. The processing in FIG. 12 then ends.

Figure 13:
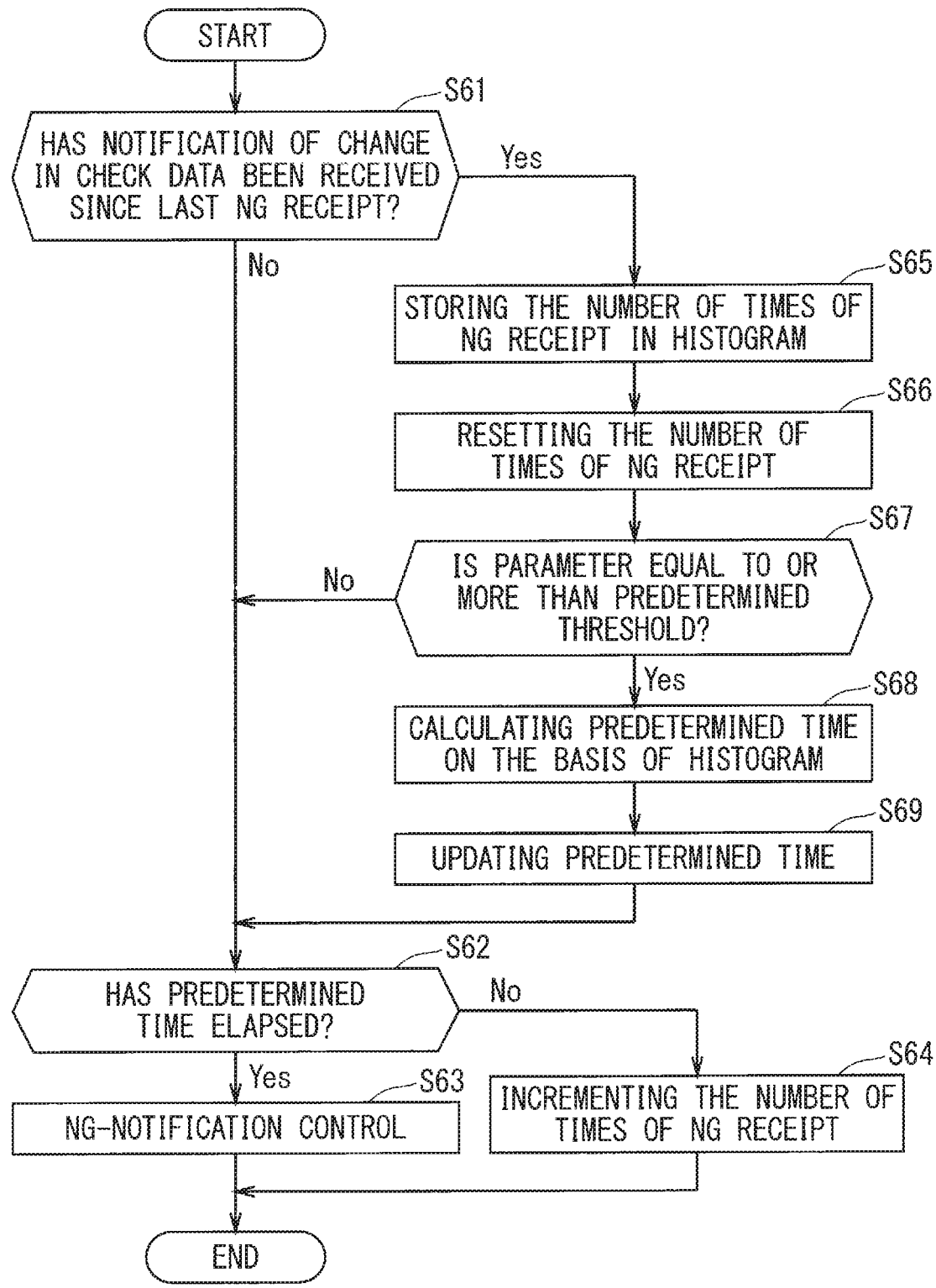
FIG. 13 is a flowchart showing processing in the display control apparatus according to the third embodiment.

FIG. 13 is a flowchart showing inspection result determination according to the third embodiment. This processing is performed if the inspection-result determination unit 27 receives a notification of NG from the image inspection unit 26.

In the first step, step S61, the inspection-result determination unit 27 determines whether it has received a notification of a change in the check data from the inspection controller 25 since the last NG receipt. That is, the inspection-result determination unit 27 determines whether the image has changed since the last NG receipt. The processing proceeds to step S65 in response to a determination that the notification has been received since the last NG receipt. The processing proceeds to step 62 in response to a determination that no such notification has been received since the last NG receipt.

In step S62, the inspection-result determination unit 27 determines whether the predetermined time T has elapsed from the first time point t1. If the predetermined time T has elapsed from the first time point t1, the processing proceeds to step S63; If the predetermined time T has not elapsed from the first time point t1, to step S64.

In step S63, the inspection-result determination unit 27 determines that the display control is abnormal, that is, a determination of NG. The inspection-result determination unit 27 then performs notification control for NG notification. The processing in FIG. 13 then ends.

In step S64, the inspection-result determination unit 27 increments the number of times of NG receipt. The processing in FIG. 13 then ends.

For proceeding from step S61 to step S65, a series of processing from step S65 through step S69 updates the predetermined time T into a suitable time on the basis of the time history from the first time point t1 to the second time point t2. To be specific, the inspection-result determination unit 27, in step 65, firstly stores the number of times of NG receipt as incremented, as histogram bins. In step S66, the inspection-result determination unit 27 resets the number of times of NG receipt.

In step S67, the inspection-result determination unit 27 determines whether the number of data pieces, i.e., parameter, of the number of times of NG receipt is equal to or more than a predetermined threshold. If the parameter is equal to or more than the predetermined threshold, the processing proceeds to step S68; If the parameter is less than the predetermined threshold, to step S62.

In step S68, the inspection-result determination unit 27 calculates the predetermined time T on the basis of the histogram. For instance, the inspection-result determination unit 27 calculates the predetermined time T on the basis of the number of times of NG receipt that has a highest histogram-bin or the number of times of NG receipt that has a highest histogram-frequency, and on the basis of the cycle of the sync signal.

In step S69, the inspection-result determination unit 27 updates a predetermined time T that is used in step 62 into the calculated, predetermined time T. The processing then proceeds to step S62.

Gist of Third Embodiment

In the display control apparatus 1 according to the third embodiment, the inspection-result determination unit 27 stops the determination until the predetermined time T elapses from the first time point t1, and performs the determination after the predetermined time T elapses from the first time point t1. Such a configuration, like the corresponding configuration in the first embodiment, prevents excessive determination that the display control is abnormal.

In the third embodiment, the predetermined time T is changed on the basis of the time history from the first time point t1 to the second time point t2. Such a configuration enables automatic setting of the predetermined time T to a suitable time.

Fourth Embodiment

Figure 14:
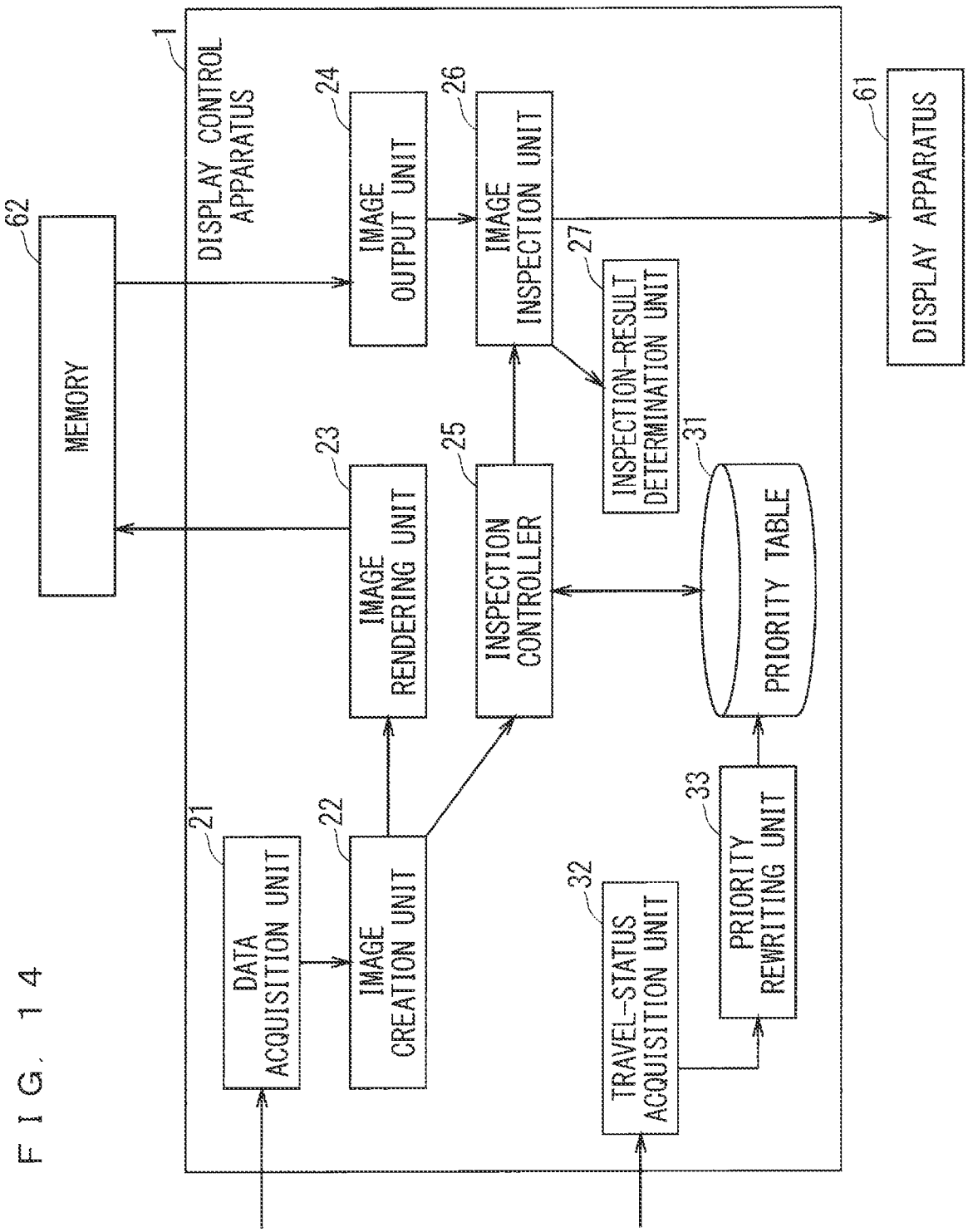
FIG. 14 is a block diagram illustrating the configuration of a display control apparatus according to a fourth embodiment.

FIG. 14 is a block diagram illustrating the configuration of a display control apparatus according to a fourth embodiment. Identical or similar components between the second and fourth embodiments are denoted by the same reference signs. Mainly described herein are different components between the second and fourth embodiments.

The display control apparatus 1 in FIG. 14 is installed in a vehicle, which is not shown, and is movable along with the vehicle. Hereinafter, the vehicle that is movable along with the display control apparatus 1 is referred to as a "subject vehicle".

The image creation unit 22 generates a generated image including a plurality of partial images, on the basis of an external input acquired in the data acquisition unit 21. The following describes an example of the configuration of the display control apparatus 1 according to the fourth embodiment in which the external input contains the status of an ECU installed in the subject vehicle. However the external input and the configuration are not limited to the following example.

The image creation unit 22 generates a warning image including the plurality of partial images, on the basis of the status of the ECU installed in the subject vehicle, the status being contained in the external input. The plurality of partial images include images indicating vehicle status, engine status, gasoline level equal to or less than a predetermined value, the ON/OFF status of a right and left direction indicators, the ON/OFF status of a parking brake, shift lever status, and other kinds of status. The image creation unit 22 also generates a check data piece for each partial image on the basis of the external input.

Here, the display control apparatus 1 in FIG. 14 includes a priority table 31, a travel-status acquisition unit 32, and a priority rewriting unit 33.

The priority table 31 contains priorities that are predefined for the respective plurality of partial images. FIG. 15 illustrates one example of the defined priorities in the priority table 31. In this example in FIG. 15, the priorities are defined so that different priorities are given to different objects to be inspected, i.e., different contents of the partial images.

The travel-status acquisition unit 32, like the data acquisition unit 21, acquires the travel status of the subject vehicle from the status of the ECU installed in the subject vehicle. The priority rewriting unit 33 changes the priorities in the priority table 31 on the basis of the travel status of the subject vehicle as acquired in the travel-status acquisition unit 32. For instance, the priority rewriting unit 33 gives a high priority with regard to tire abnormality in the subject vehicle during its travel, and gives a low priority with regard to tire abnormality in the subject vehicle during its stop.

Upon receiving the check data from the image creation unit 22, the inspection controller 25, like the same in the second embodiment, stops the image inspection unit 26 from performing an inspection, and allows the image inspection unit 26 to perform the inspection after the predetermined time T elapses from the time of check data receipt from the image creation unit 22.

Figure 16:
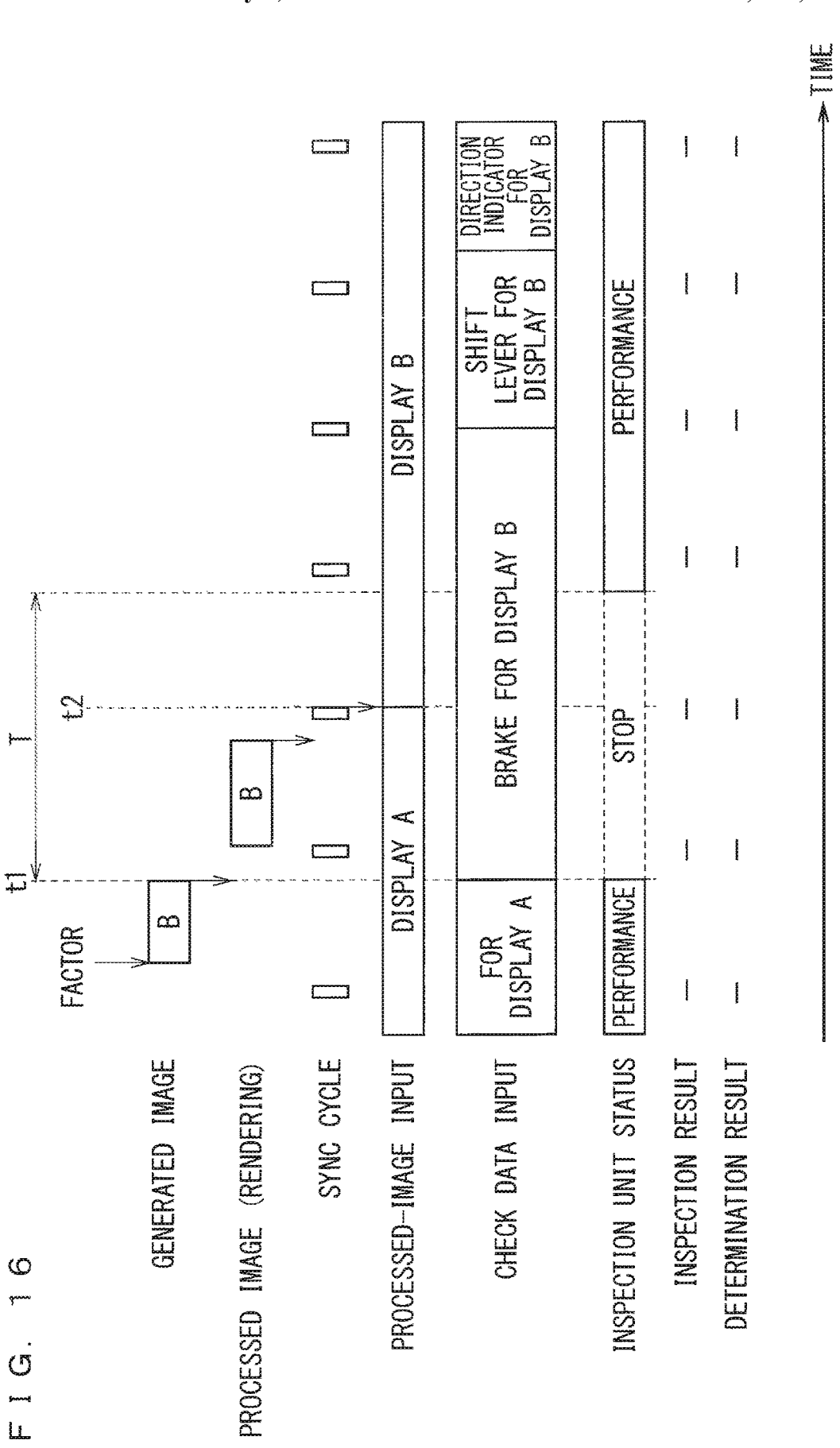
FIG. 16 is a timing chart showing the operation of the display control apparatus according to the fourth embodiment.

In addition, the inspection controller 25 receives the check data pieces of the individual partial images from the image creation unit 22, to thus find that there are several images to be inspected. As indicated by an item, "Check Data Input" in FIG. 16, the inspection controller 25 then writes, in order, the check data pieces of the individual partial images into the image inspection unit 26. Accordingly, the partial images different from one another will undergo inspection in the image inspection unit 26, and by extension, undergo determination in the inspection-result determination unit 27, at times different from one another. Hereinafter, determination whether the display control is abnormal will be referred to as "control abnormality determination".

In the fourth embodiment, the inspection controller 25 writes the check data pieces of the individual partial images into the image inspection unit 26 in descending order of the priorities of the partial images. Such an inspection controller 25 controls, on the basis of the priorities of the partial images, the order of the control abnormality determination on the partial images. For instance, FIG. 15 shows an item, "Brake Status" with a priority of 80, and an item, "Shift Lever Status" with a priority of 70, and an item, "Direction Indicator" with a priority of 50. When the priorities are defined in this way, the inspection controller 25 writes the check data pieces into the image inspection unit 26 in the order of "brake", "shift lever", and "direction indicator", as indicated by an item, "Check Data Input" in FIG. 16.

In the fourth embodiment, the inspection controller 25 also extends time for the check data pieces that are used by the image inspection unit 26 in descending order of the priorities. Such an inspection controller 25 controls, on the basis of the priorities of the partial images, the duration of the time for performing the control abnormality determination on the partial images. For instance, when the priorities are defined as illustrated in FIG. 15, the inspection controller 25 extends the time for the check data pieces that are used by the image inspection unit 26 in the order of "brake", "shift lever", and "direction indicator", as indicated by "Check Data Input" in FIG. 16.

Figures 17, 18, 19:
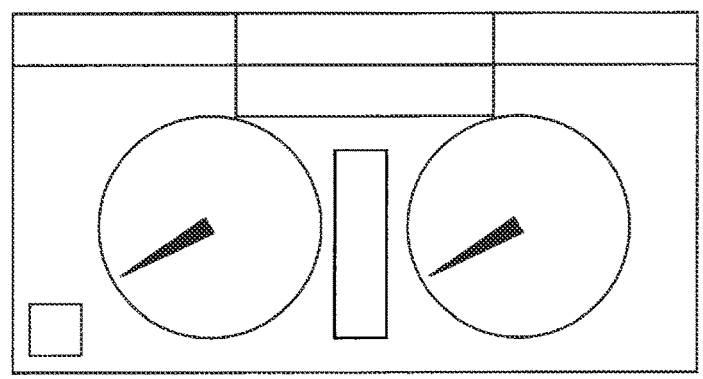
FIG. 17 is a table showing one example of frames according to the fourth embodiment.
FIG. 18 is a table showing one example of priorities according to the fourth embodiment.
FIG. 19 is a diagram illustrating one example of a partial image according to the fourth embodiment.

It is noted that the time for the check data pieces that are used by the image inspection unit 26, that is, the number of frames, may be calculated using a predetermined expression relating to priority, or may be predefined in a table illustrated in FIG. 17. Further, a time during which the image inspection unit 26 uses the check data piece of the partial image with a highest priority is, preferably, sufficiently long so that this partial image with the highest priority undergoes inspection in the image inspection unit 26, and by extension, undergoes determination in the inspection-result determination unit 27.

Gist of Fourth Embodiment

In the display control apparatus 1 according to the fourth embodiment, the partial images different from one another undergo control abnormality determination at the times different from one another. This achieves an inspection even when partial images to be inspected in the image inspection unit 26 within a single generated image outnumbers partial images that can be inspected at one time.

In such a display control apparatus 1, the control abnormality determination tends to have high accuracy as determination time extends. In view of this tendency, the inspection controller 25 in the fourth embodiment controls, on the basis of the priorities of the partial images, the duration of the time for performing the control abnormality determination on the partial image. Such a configuration enhances the accuracy of the control abnormality determination on an important partial image.

The time allotted to the control abnormality determination on the generated image can be considerably short, depending on the operation of the display control apparatus 1. In this case, control abnormality determination on the plurality of partial images on a random basis can run out of time before control abnormality determination on the important partial image. In view of this problem, the inspection controller 25 in the fourth embodiment controls the order of the control abnormality determination on the partial images on the basis of their priorities. Such a configuration enables early control abnormality determination on an important partial image prior to the other less important partial images. As a result, the important partial image more probably undergoes control abnormality determination before time is up.

In the foregoing description, these priorities, although defined so that different priorities are given to different contents of the partial images (FIG. 15), may be defined so that different priorities are given to different display regions in which the partial images are displayed in the display apparatus 61, as illustrated in FIG. 18. FIG. 19 is a diagram illustrating one example of the partial images displayed in the respective display regions of the display apparatus 61. The priority definition as illustrated in FIG. 19 achieves an effect similar to the prior definition as illustrated in FIG. 15.

In the fourth embodiment, the priorities are changed based on the travel status of the subject vehicle. Such a configuration enables priority change that is suitable for the travel status of the subject vehicle.

Fifth Embodiment

Figure 20:
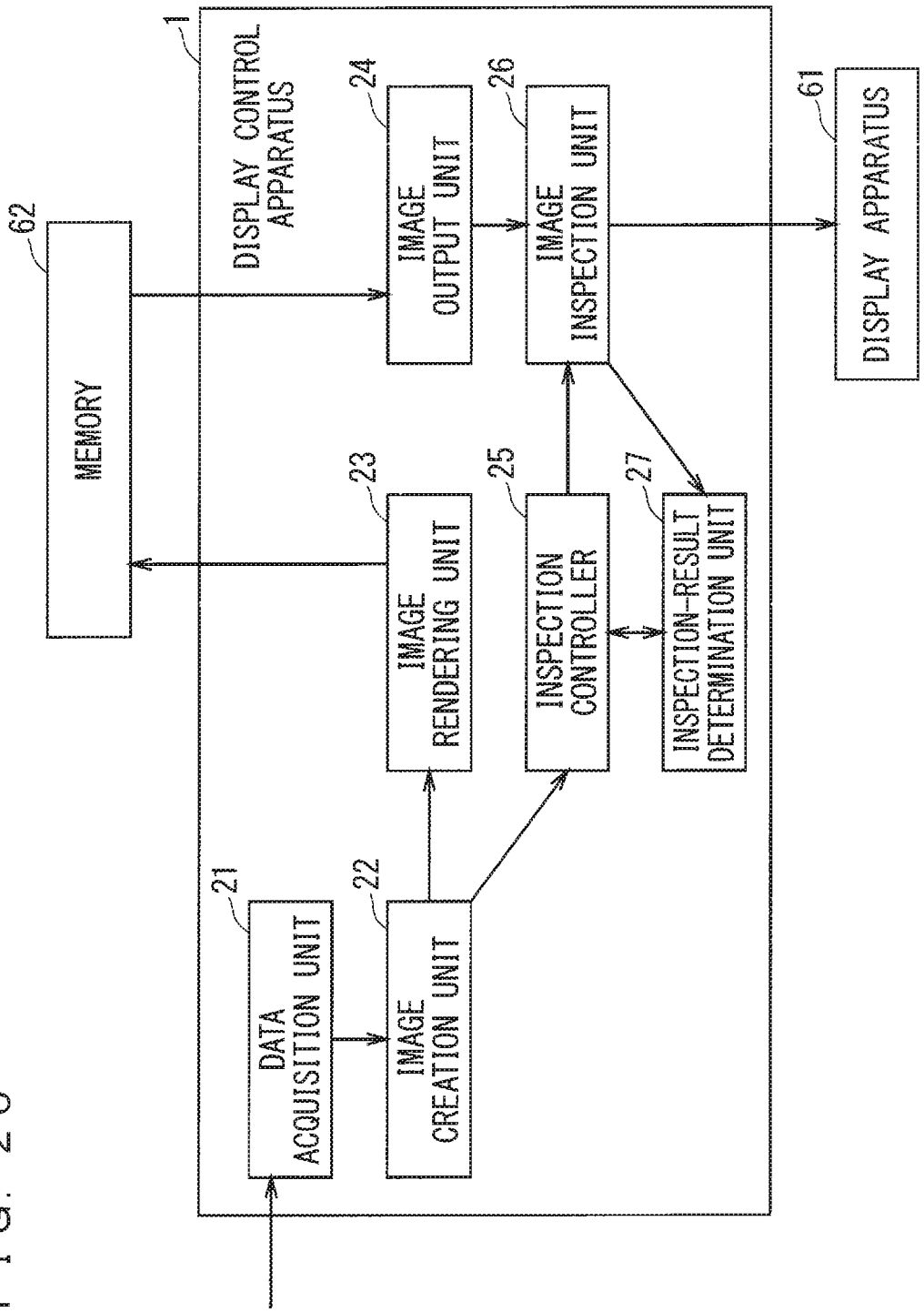
FIG. 20 is a block diagram illustrating the configuration of a display control apparatus according to a fifth embodiment.

FIG. 20 is a block diagram illustrating the configuration of a display control apparatus according to a fifth embodiment. Identical or similar components between the third and fifth embodiments are denoted by the same reference signs. Mainly described herein are different components between the third and fifth embodiments.

In response to a change in an external input acquired by the data acquisition unit 21, the image creation unit 22 generates an image on the basis of the external input, and then outputs the image to the image rendering unit 23. At the same time, the image creation unit 22 generates check data that is consistent with the image, and then outputs the check data to the inspection controller 25. Moreover, the image creation unit 22 in the fifth embodiment additionally acquires failure data on the basis of the external input. This failure data is used to check that the desired image is not input to the display apparatus 61. An example of failure data acquisition is similar to the example of generated-image acquisition. The following describes the configuration of the image creation unit 22 that generates the failure data.

Upon receiving the check data from the image creation unit 22, the inspection controller 25 writes the check data into the image inspection unit 26, and at the same time, notifies the inspection-result determination unit 27 of a change in the check data. In the fifth embodiment, the inspection controller 25 writes the failure data as generated in the image creation unit 22 into the image inspection unit 26 in a certain time period after a predetermined time T elapses from a first time point t1, and at the same time, notifies the inspection-result determination unit 27 of failure data writing, as indicated by an item, "Check Data Input" in FIG. 21. Here, the certain time period is freely set.

The image inspection unit 26 performs an inspection similar to the aforementioned inspection in the certain period after the predetermined time T elapses from the first time point t1, on the basis of a processed image that is output from the image output unit 24, and the failure data as generated in the image creation unit 22. For instance, the image inspection unit 26 determines that the processed image as received is not a desired image, and at the same time, determines that the desired image is not input to the display apparatus 61, when determining that the difference between an inspection value of the processed image and an inspection value contained in the failure data as received is less than a threshold. As such, for a normal inspection in the image inspection unit 26, an inspection using the failure data provides an inspection result that the desired image is not input to the display apparatus 61.

Figure 21:
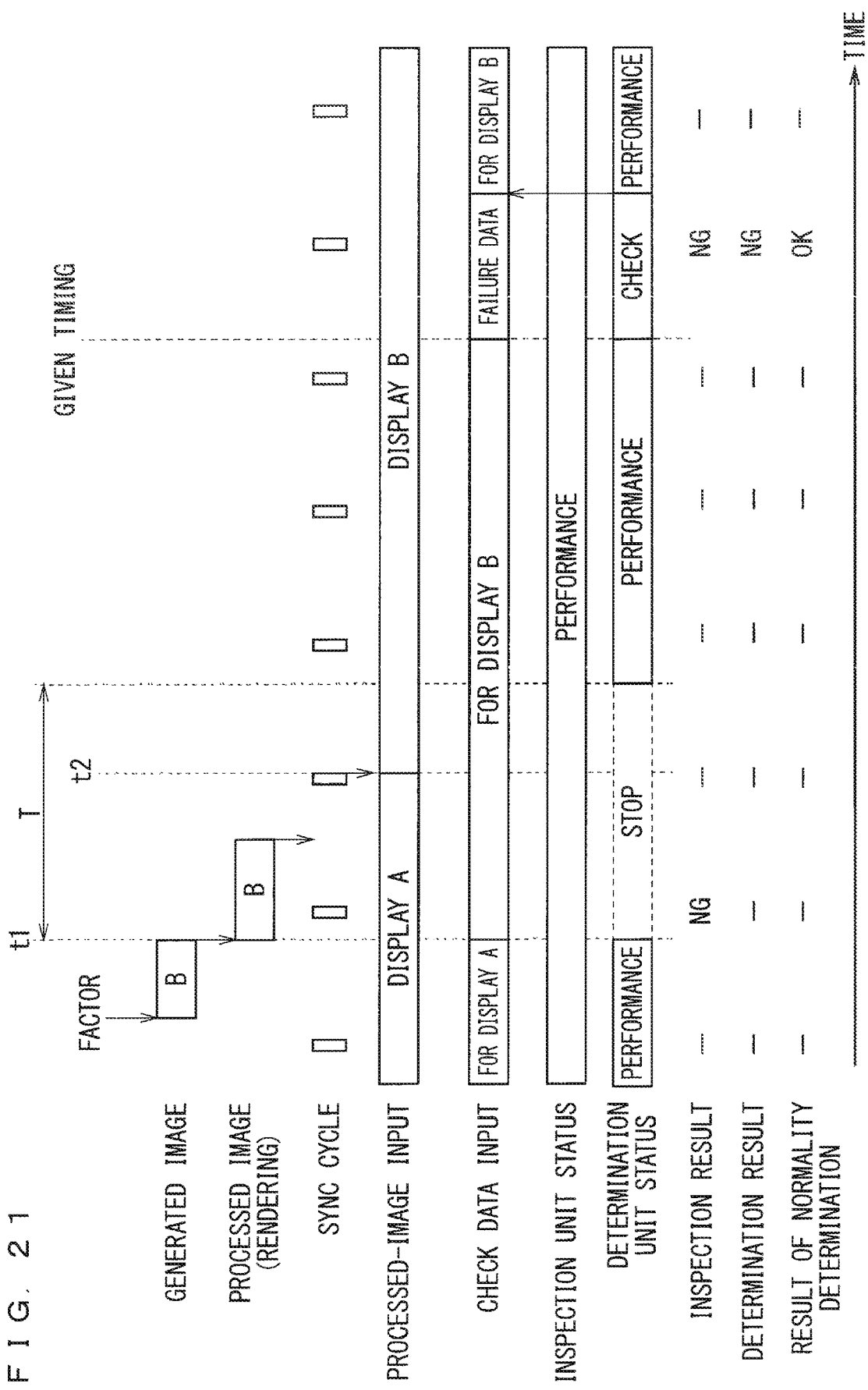
FIG. 21 is a timing chart showing the operation of the display control apparatus according to the fifth embodiment.

As indicated by an item, "Determination Result" in FIG. 21, the inspection-result determination unit 27 stops the determination until the predetermined time T elapses from the first time point t1, and performs the determination after the predetermined time T elapses from the first time point t1.

As indicated by an item, "Result of Normality Determination" in FIG. 21, the inspection-result determination unit 27 in the fifth embodiment determines whether it has received a notification of failure data writing from the inspection controller 25 in the certain period after the predetermined time T elapses from the first time point t1, and at the same time, determines whether the image inspection unit 26 has provided an inspection result that the desired image is not input to the display apparatus 61. The inspection-result determination unit 27 determines that the inspection in the image inspection unit 26, and by extension, display control determination are normal, when a determination is made that the notification of failure data writing from the inspection controller 25 is received and the image inspection unit 26 has provided the inspection result that the desired image is not input to the display apparatus 61.

In this way, the inspection controller 25, the image inspection unit 26, and the inspection-result determination unit 27 determine whether control abnormality determination is normal, in the certain period after the predetermined time T elapses from the first time point t1, on the basis of the processed image as output from the image output unit 24 and the failure data as generated in the image creation unit 22. It is noted that such a determination may be perform at the start-up of the display control apparatus 1.

Operation

Figure 22:
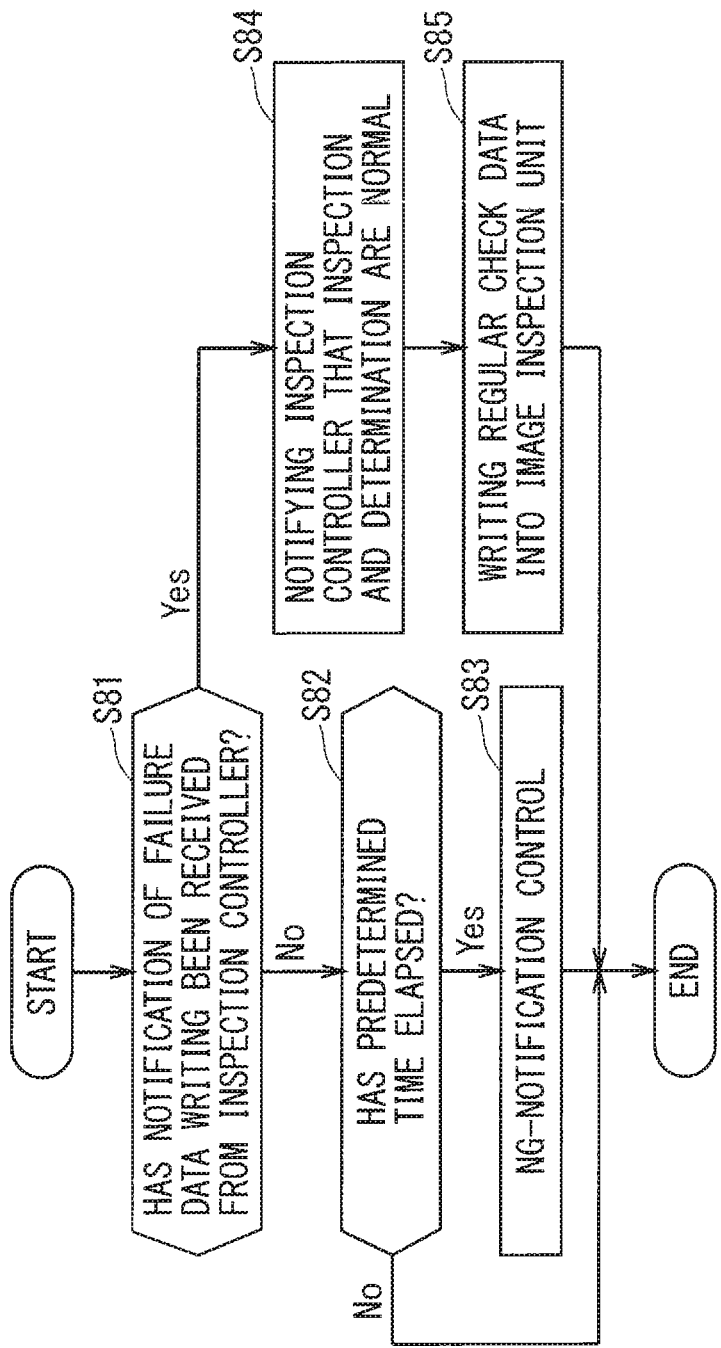
FIG. 22 is a flowchart showing processing in the display control apparatus according to the fifth embodiment.

FIG. 22 is a flowchart showing inspection result determination according to the fifth embodiment. This processing is performed when the inspection-result determination unit 27 receives a notification of NG from the image inspection unit 26.

In step S81, the inspection-result determination unit 27 firstly determines whether it has received, from the inspection controller 25, a notification of failure data writing, that is, a notification for the ignorance of an inspection result. If the inspection-result determination unit 27 has received the notification, the processing proceeds to step S84; If the inspection-result determination unit 27 has not received the notification, to step 82.

In step S82, the inspection-result determination unit 27 determines whether the predetermined time T has elapsed from the first time point t1. If the predetermined time T has elapsed from the first time point t1, the processing proceeds to step S83; If the predetermined time T has not elapsed from the first time point t1, the processing in FIG. 22 ends.

In step S83, the inspection-result determination unit 27 determines that display control is abnormal, that is, a determination of NG. The inspection-result determination unit 27 then performs notification control for NG notification. The processing in FIG. 22 then ends.

For proceeding from step S81 to step S84, the inspection-result determination unit 27 notifies the inspection controller 25 that the inspection in the image inspection unit 26 and the display control determination are normal. In step S85, the inspection controller 25 writes regular check data into the image inspection unit 26 in which the failure data is written. The processing in. FIG. 22 then ends.

Gist of Fifth Embodiment

The display control apparatus 1 according to the fifth embodiment determines whether the control abnormality determination is normal in the certain period after the predetermined time T elapses from the first time point t1 or at the start-up of the display control apparatus 1, on the basis of the processed image as output from the image output unit 24 and of the failure data. Such a configuration enhances the reliability of the determination in the display control apparatus 1.

Other Modifications

Figure 23:
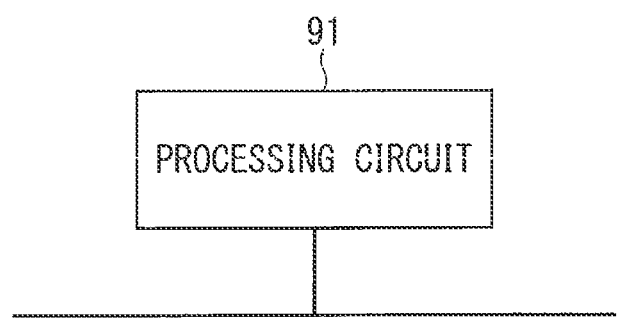
FIG. 23 is a block diagram illustrating hardware configuration in a display control apparatus according to another modification.

Hereinafter, the image acquisition unit 11, the image transmitter 12, and the controller 13, which are included in the display control apparatus 1, will be referred to as "the image acquisition unit 11 and the other components". The image acquisition unit 11 and the other components are implemented by a processing circuit 91 illustrated in FIG. 23. That is, the processing circuit 91 includes the following: the image acquisition unit 11 configured to acquire, on the basis of an external input, a first image and check data for checking that a third image is input to the display apparatus 61, the third image being to be acquired from the first image having normally undergone pre-processing; the image transmitter 12 configured to output, to the display apparatus 61, a second image being the first image that has undergone the pre-processing; and the controller 13 configured to determine, whenever necessary, on the basis of the second image as output from the image transmitter 12 and the check data as acquired in the image acquisition unit 11, whether control in the display control apparatus 1 over the display apparatus 61 is abnormal, and to stop the determination until a predetermined time elapses from a first time point, the predetermined time being equal to or greater than a time from the first time point at which the check data is input, to a second time point at which the second image is input. The processing circuit 91 may be dedicated hardware or a processor to execute a program stored in a memory. Examples of the processor include a central processing unit, a processing unit, a calculator, a microprocessor, a microcomputer, and a digital signal processor.

For dedicated hardware used as the processing circuit 91, examples of the processing circuit 91 include a single circuit, a complex circuit, a programmed processor, a parallel programmed processor, an application-specific integrated circuit (ASIC), a field-programmable gate array (FPGA), and a combination thereof. The functions of the image acquisition unit 11 and the other components each may be implemented by a decentralized processing circuit. Alternatively, the functions of the image acquisition unit 11 and the other components may be, all together, implemented by a single processing circuit.

Figure 24:
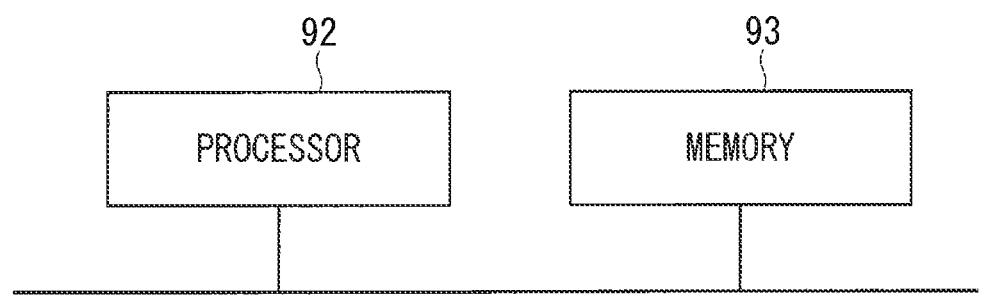
FIG. 24 is a block diagram illustrating hardware configuration in a display control apparatus according to still another modification.

For a processor used as the processing circuit 91, the functions of the image acquisition unit 11 and the other components are implemented in combination with software and other things. Examples of the software and other things include software, firmware, and a combination of software and firmware. The software and other things are written as a program and stored in a memory. As illustrated in FIG. 24, a processor 92 serving as the processing circuit 91 reads a program stored in a memory 93 for execution, to thus implement the function of each component. That is, the display control apparatus 1 includes the memory 93 to store a program, which, when executed by the processing circuit 91, performs the following steps: acquiring, on the basis of the external input, the first image and the check data for checking that the third image is input to the display apparatus 61, and then outputting the check data to the controller 13, the third image being to be acquired from the first image having normally undergone pre-processing; outputting, to the display apparatus 61 and the controller 13 of the display control apparatus 1, the second image being the first image that has undergone the pre-processing; and determining, whenever necessary, on the basis of the second image as input to the controller 13 and the check data as input to the controller 13, whether the control in the display control apparatus 1 over the display apparatus 61 is abnormal. The determination step includes stopping the determination until the predetermined time elapses from the first time point, the predetermined time being equal to or greater than the time from the first time point at which the check data is input to the controller 13, to the second time point at which the second image is input to the controller 13. In other words, this program is for a computer to execute the procedure or method of the image acquisition unit 11 and of the other components. Here, examples of the memory 93 include a non-volatile or volatile semiconductor memory, such as a random access memory (RAM), a read only memory (ROM), a flash memory, an erasable programmable read only memory (EPROM), or an electrically erasable programmable read only memory (EEPROM), and include a hard disk drive (HDD), a magnetic disc, a flexible disc, an optical disc, a compact disc, a mini disc, a digital versatile disc (DVD), and a driver thereof.

The foregoing has described that each function of the image acquisition unit 11 and the other components is implemented by one of hardware, software, and other things. Some part of the image acquisition unit 11 and of the other components may be implemented by dedicated hardware; and the other part, by software and other things.

The display control apparatus 1 in the foregoing description can be used also as a display control system that is established as a system in combination, as necessary, with a navigation device, such as a portable navigation device (PND), with a communication terminal including a mobile terminal, such as a mobile phone, a smart phone, or a tablet, with the functions of applications installed therein, and with a server. In this case, the individual functions or individual components of the display control apparatus 1 described above may be decentralized in the individual devices constituting this system, or may be centralized in any of these devices.

It is noted that in the present invention, the individual embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 1 display control apparatus, 11 image acquisition unit, 12 image transmitter, 13 controller, 25 inspection controller, 26 image inspection unit, 27 inspection-result determination unit, 61 display apparatus.

The invention claimed is:

1. A display control apparatus that controls display in a display apparatus, the display control apparatus comprising:
a processor to execute a program; and
a memory to store the program which, when executed by the processor, performs,
an image acquisition process acquiring a first image on the basis of an external input,
an image transmitter process outputting, to the display apparatus, a second image being the first image that has undergone pre-processing for display in the display apparatus,
the image acquisition process further acquiring, on the basis of the external input, check data for checking that a third image is input to the display apparatus, the third image being to be acquired from the first image having normally undergone the pre-processing,
a control process determining, whenever necessary, on the basis of the second image as input to a controller of the display control apparatus and of the check data as input to the controller, whether the control in the display control apparatus over the display apparatus is abnormal, and
stopping the determination until a predetermined time elapses from a first time point, the predetermined time being equal to or greater than a time from the first time point at which the check data is input to the controller to a second time point at which the second image is input to the controller.

2. The display control apparatus according to claim 1, wherein the control process comprises
an image inspection process inspecting, whenever necessary, on the basis of the second image as input to an image inspection unit included in the controller and of the check data as input to the image inspection unit, whether the third image is not input to the display apparatus,
an inspection control process stopping the image inspection process from performing the inspection until the predetermined time elapses from the first time point, and allowing the image inspection process to perform the inspection after the predetermined time elapses from the first time point, and
an inspection-result determination process determining that the control in the display control apparatus over the display apparatus is abnormal when an inspection result that the third image is not input to the display apparatus is obtained in the image inspection process.

3. The display control apparatus according to claim 1, wherein the control process comprises
an image inspection process inspecting, whenever necessary, on the basis of the second image as input to an image inspection unit included in the controller and of the check data as input to the image inspection unit, whether the third image is not input to the display apparatus, and
an inspection-result determination process determining that the control in the display control apparatus over the display apparatus is abnormal when an inspection result that the third image is not input to the display apparatus is obtained in the image inspection process, and
stopping the determination until the predetermined time elapses from the first time point, and performing the determination after the predetermined time elapses from the first time point.

4. The display control apparatus according to claim 1, wherein the image acquisition process acquires the first image including a plurality of partial images on the basis of the external input, and acquires the check data for each of the plurality of partial images, and
wherein the control process performs the determination on the plurality of partial images different from one another at times different from one another.

5. The display control apparatus according to claim 4, wherein each partial image has a priority predefined, and
wherein the control process controls, on the basis of the priorities of the plurality of partial images, duration of the time for performing the determination on each of the plurality of partial images.

6. The display control apparatus according to claim 5, wherein the priorities are defined so that different priorities are given to different display regions in which the plurality of partial images are displayed in the display apparatus.

7. The display control apparatus according to claim 5, wherein the priorities are defined so that different priorities are given to different contents of the plurality of partial images.

8. The display control apparatus according to claim 5, wherein the control process controls, on the basis of the priorities of the plurality of partial images, order of performing the determination on the plurality of partial images.

9. The display control apparatus according to claim 5, wherein the display apparatus is movable along with a vehicle, and is configured to change the priorities on the basis of travel status of the vehicle.

10. The display control apparatus according to claim 1, wherein the image acquisition process further acquires, on the basis of the external input, failure data for checking that the third image is not input to the display apparatus, and
wherein the control process determines whether the determination is normal, in a certain time period after the predetermined time elapses from the first time point or at start-up of the display control apparatus, on the basis of the second image as output in the image transmitter process and the failure data as acquired in the image acquisition process.

11. The display control apparatus according to claim 1, wherein the display control apparatus is configured to change the predetermined time on the basis of a time history from the first time point to the second time point.

12. A display control method in a display control apparatus that controls display in a display apparatus, the display control method comprising:

acquiring a first image on the basis of an external input;

outputting, to the display apparatus and a controller of the display control apparatus, a second image being the first image that has undergone pre-processing for display in the display apparatus;

further acquiring, on the basis of the external input, check data for checking that a third image is input to the display apparatus, the third image being to be acquired from the first image having normally undergone the pre-processing, and then outputting the check data to the controller;

determining, whenever necessary, on the basis of the second image as input to the controller and the check data as input to the controller, whether the control in the display control apparatus over the display apparatus is abnormal; and stopping the determination until a predetermined time elapses from a first time point, the predetermined time being equal to or greater than a time from the first time point at which the check data is input to the controller to a second time point at which the second image is input to the controller.

\* \* \* \* \*